(12) United States Patent
Sako et al.

(10) Patent No.: US 10,318,028 B2
(45) Date of Patent: Jun. 11, 2019

(54) CONTROL DEVICE AND STORAGE MEDIUM

(71) Applicant: SONY CORPORATION, Tokyo (JP)

(72) Inventors: Yoichiro Sako, Tokyo (JP); Seiji Wada, Kanagawa (JP); Hiroaki Ogawa, Chiba (JP); Hiroshi Mukawa, Kanagawa (JP); Tatsuya Narahara, Kanagawa (JP); Motoyuki Takai, Tokyo (JP); Yasushi Miyajima, Kanagawa (JP); Ikuo Tsukagoshi, Tokyo (JP); Kohei Asada, Kanagawa (JP); Kazuyuki Sakoda, Chiba (JP); Masashi Takeda, Tokyo (JP); Akira Tange, Tokyo (JP); Kazuhide Kemmochi, Tokyo (JP); Ichigo Hayakawa, Tokyo (JP); Takao Tanikame, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/698,841

(22) Filed: Sep. 8, 2017

(65) Prior Publication Data
US 2017/0371439 A1    Dec. 28, 2017

Related U.S. Application Data

(63) Continuation of application No. 14/428,111, filed as application No. PCT/JP2013/068755 on Jul. 9, 2013, now Pat. No. 9,791,948.

(30) Foreign Application Priority Data

Sep. 21, 2012  (JP) ................................ 2012-208029

(51) Int. Cl.
*G06F 1/16* (2006.01)
*G06F 3/041* (2006.01)
(Continued)

(52) U.S. Cl.
CPC .......... *G06F 3/041* (2013.01); *G02B 27/017* (2013.01); *G06F 3/011* (2013.01); *G06F 3/017* (2013.01);
(Continued)

(58) Field of Classification Search
CPC combination set(s) only.
See application file for complete search history.

(56) References Cited

U.S. PATENT DOCUMENTS 8,228,315 B1   7/2012  Starner et al.
9,213,897 B2  12/2015  Nakai et al.
(Continued)

FOREIGN PATENT DOCUMENTS

CN   102207819 A   10/2011
EP     2372495 A2   10/2011
(Continued)

OTHER PUBLICATIONS

Office Action for JP Patent Application No. 2014-536639, dated Sep. 26, 2017, 02 pages of Office Action and 02 pages of English Translation.
(Continued)

*Primary Examiner* — Van N Chow
(74) *Attorney, Agent, or Firm* — Chip Law Group

(57) ABSTRACT

According to the present disclosure, there is provided a control device including a detection unit configured to detect, as a manipulation region, at least a part of a substantial object present at a position at which a user is estimated to be able to perform a manipulation, a function setting unit configured to perform setting in a manner that a predetermined function matches the manipulation region detected by the detection unit, and a control unit configured to perform the function matched with the manipulation
(Continued)

region based on a positional relation between the manipulation region and a manipulator.

7 Claims, 15 Drawing Sheets

(51) Int. Cl.
    *G06F 3/01*         (2006.01)
    *G06F 3/03*         (2006.01)
    *G06F 3/0481*     (2013.01)
    *G06F 3/0484*     (2013.01)
    *G02B 27/01*      (2006.01)

(52) U.S. Cl.
    CPC ........ *G06F 3/0304* (2013.01); *G06F 3/04815* (2013.01); *G06F 3/04842* (2013.01); *G02B 2027/0178* (2013.01)

(56) References Cited

U.S. PATENT DOCUMENTS

| | | |
|---|---|---|
| 2009/0153468 A1 | 6/2009 | Ong et al. |
| 2009/0168027 A1 | 7/2009 | Dunn et al. |
| 2010/0177035 A1 | 7/2010 | Schowengerdt et al. |
| 2010/0199232 A1 | 8/2010 | Mistry et al. |
| 2011/0006991 A1 | 1/2011 | Elias |
| 2011/0234386 A1 | 9/2011 | Matsuda |
| 2013/0016070 A1 | 1/2013 | Starner et al. |

FOREIGN PATENT DOCUMENTS

| | | |
|---|---|---|
| JP | 2000-298544 A | 10/2000 |
| JP | 2009-245392 A | 10/2009 |
| JP | 2010-205031 A | 9/2010 |
| JP | 2011-170585 A | 9/2011 |
| JP | 2011-198150 A | 10/2011 |
| JP | 2011-209965 A | 10/2011 |
| JP | 2011-227644 A | 11/2011 |
| JP | 2011-227649 A | 11/2011 |
| JP | 2012-014406 A | 1/2012 |
| JP | 2012-108577 A | 6/2012 |
| KR | 10-2011-0109883 A | 10/2011 |
| WO | 2013/009482 A2 | 1/2013 |

OTHER PUBLICATIONS

Kim, et al., "Using Keyboards with Head Mounted Displays", XP-002674991, pp. 336-343.

Non Final Office Action for U.S. Appl. No. 14/428,111, dated Aug. 25, 2016, 06 pages.

Final Office Action for U.S. Appl. No. 14/428,111, dated Mar. 14, 2017, 06 pages.

Advisory Action for U.S. Appl. No. 14/428,111, dated May 17, 2017, 03 pages.

Notice of Allowance for U.S. Appl. No. 14/428,111, dated Jun. 14, 2017, 10 pages.

International Search Report and Written Opinion of PCT Application No. PCT/JP2013/068755, dated Oct. 15, 2013, 06 pages of English Translation and 06 pages of ISRWO.

International Preliminary Report on Patentability of PCT Application No. PCT/JP2013/068755, dated Apr. 2, 2015, 07 pages of English Translation and 04 pages of IPRP.

CONTROL DEVICE AND STORAGE MEDIUM

CROSS REFERENCE TO RELATED APPLICATIONS

The present application is a continuation application of U.S. patent application Ser. No. 14/428,111, filed on Mar. 13, 2015, which is a National Stage Entry of PCT/JP2013/068755, filed Jul. 9, 2013, which is a continuation of Japanese Patent Application 2012-208029, filed in the Japan Patent Office on Sep. 21, 2012, the entire contents of each of the above are hereby incorporated by reference.

TECHNICAL FIELD

The present disclosure relates to a control device and a storage medium.

BACKGROUND ART

In desktop personal computers (PC), keyboards and mouses placed on desks are generally used as manipulation input devices.

In regard to manipulation input devices, an input and output device capable of realizing input and output without taking up space on a desk is disclosed in Patent Literature 1. Specifically, the input and output device disclosed in Patent Literature 1 includes a projector that is installed on a desk and projects a display screen and manipulation keys onto the desk and a capturing video camera that images an input manipulation performed by a manipulator. The manipulator performs an input manipulation on the display screen projected onto the desk. Thus, because it is not necessary to arrange various display devices, manipulation keyboards, and the like on desks, desk space can be simplified, and thus reception counters and desk space can be beautified for a better image.

CITATION LIST

Patent Literature

Patent Literature 1: JP 2000-298544A

SUMMARY OF INVENTION

Technical Problem

Here, mobile terminals such as portable telephone terminals or notebook-type PCs that have become widespread recently are structured such that liquid crystal display screens can be folded to be combined with keyboards. In tablet terminals or smartphones, manipulation screens are displayed on liquid crystal display screens and users' touch manipulations are detected. All of the terminals are mobile terminals which users hold and in which manipulation input devices corresponding to keyboards or the like are installed.

In the field of mobile terminals, devices (head-mounted display (HMD)) in which display units are disposed immediately in front of the eyes of users by glasses-type or head-mounted-type mounting units to perform display have been proposed. The greatest feature of such apparatuses is that they are hands-free, and such apparatuses are not compatible with manipulations performed with manipulation input devices corresponding to keyboards, mouses, or the like.

However, it may sometimes be difficult to perform exact manipulations only with manipulation inputs of sounds or gestures, and it is sometimes difficult to input text. Further, since the manipulations are different from manipulations to which general users are accustomed, manipulation burdens or stresses are assumed to be imposed on the user.

Accordingly, the present disclosure suggests a novel and improved control device and a novel and improved storage medium capable of virtually associating a manipulation function with a predetermined region of a substantial object.

Solution to Problem

According to the present disclosure, there is provided a control device including a detection unit configured to detect, as a manipulation region, at least a part of a substantial object present at a position at which a user is estimated to be able to perform a manipulation, a function setting unit configured to perform setting in a manner that a predetermined function matches the manipulation region detected by the detection unit, and a control unit configured to perform the function matched with the manipulation region based on a positional relation between the manipulation region and a manipulator.

According to the present disclosure, there is provided a storage medium having a program stored therein, the program causing a computer to function as a detection unit configured to detect, as a manipulation region, at least a part of a substantial object present at a position at which a user is estimated to be able to perform a manipulation, a function setting unit configured to perform setting in a manner that a predetermined function matches the manipulation region detected by the detection unit, and a control unit configured to perform the function matched with the manipulation region based on a positional relation between the manipulation region and a manipulator.

Advantageous Effects of Invention

According to the present disclosure described above, it is possible to virtually associate a manipulation function with a predetermined region of a substantial object.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The description will be made in the following order.
1. Overview of control system according to embodiment of the present disclosure
2. Example of internal configuration of HMD
3. Embodiments
3-1. First embodiment
3-2. Second embodiment
3-3. Third embodiment
3-4. Fourth embodiment
3-5. Fifth embodiment
3-6. Sixth embodiment
4. Conclusion <1. Overview Of Control System According To Embodiment Of The Present Disclosure>

First, an overview of a control system according to an embodiment of the present disclosure will be described with reference to FIG. 1.

Figure 1:
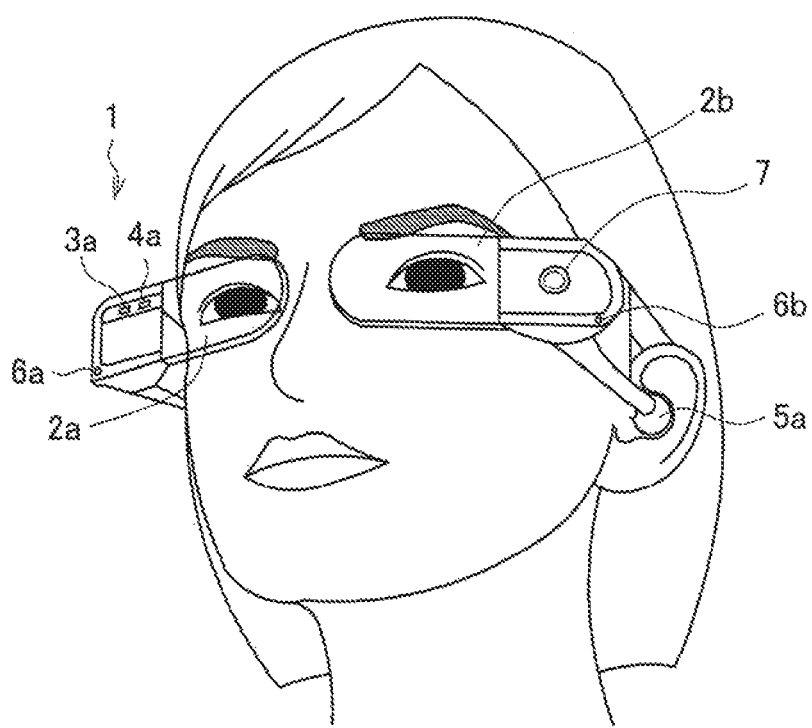
FIG. 1 is a diagram for describing an overview of a control system according to an embodiment of the present disclosure.

FIG. 1 is a diagram for describing the overview of the control system according to an embodiment of the present disclosure. As illustrated in FIG. 1, the control system according to the embodiment is applied to a head mounted display (HMD) 1 that includes a glasses-type display.

The HMD 1 (control device) according to the embodiment includes a mounting unit with, for example, a frame structure that half circulates from both sides of a head to the rear of the head and is mounted on a user to be put on both of his or her auricles, as illustrated in FIG. 1. Further, the HMD 1 has a configuration in which a pair of display units 2a and 2b for the right and left eyes are disposed immediately in front of both eyes of the user, that is, at positions of lenses of general glasses, in the mounted state illustrated in FIG. 1. For example, liquid crystal panels are used for the display units 2. By controlling transmittance, a through state, that is, a transparent state or a semi-transparent state, can be realized, as illustrated in FIG. 1. By allowing the display units 2 to be in the through state, there is no inconvenience in normal life even when the user continuously wears the HMD 1 like glasses.

The display units 2 in the transparent or semi-transparent state can display images such as text or figures so that augmented reality (AR) information can be superimposed on a scene of the real space.

The display unit 2 may display and superimpose the augmented reality (AR) information on a captured image of the real space by displaying the captured image of the real space captured by an imaging lens 3a on the display units 2. The display unit 2 may reproduce and display content received from an external device (for example, an information processing device such as a digital camera, a video camera, a portable telephone terminal, a smartphone, or a personal computer) by the HMD 1 or content stored in a storage medium of the HMD 1.

Here, examples of the content displayed on the display unit 2 may include moving-image content of a movie or a video clip, still image content captured with a digital still camera or the like, and data of an electronic book or the like. All kinds of data to be displayed, such as data for computer use such as image data, text data, or spreadsheet data generated with a personal computer or the like by a user or a game image based on a game program, can be assumed as the content.

The imaging lens 3a is disposed toward the front side for the user to perform imaging with a view direction of the user set as a subject direction when the HMD 1 is mounted on the user. A light-emitting unit 4a that performs illumination in an imaging direction of the imaging lens 3a is disposed. The light-emitting unit 4a is formed by, for example, a light-emitting diode (LED). A projector unit 7 is disposed toward the front side so that an image is projected with the view direction of the user set as a projection direction when the HMD 1 is mounted on the user.

Although illustrated only on the left ear side in FIG. 1, a pair of earphone speakers 5a which can be inserted into the right and left ear holes of the user in the mounted state are installed.

Microphones 6a and 6b that collect external sounds are disposed on the right side of the display unit 2a for the right eye and on the left side of the display unit 2b for the left eye.

FIG. 1 merely illustrates an example and diverse structures can be considered for mounting the HMD 1 on the user. The display units 2 may be formed by a mounting unit generally considered as a glasses-type or head-mounted-type. In the embodiment, at least, the display units 2 may be installed to be close in front of the eyes of the user. One pair of display units 2 may be configured to be installed to correspond to both eyes, and one display unit may also be installed to correspond to one of the eyes.

One earphone speaker 5a may be installed to be mounted only on one of the ears rather than using the right and left stereo speakers. For the microphone, one of the microphones 6a and 6b may also be used.

In FIG. 1, the example in which the projector unit 7 is included is illustrated, but an example in which the projector unit 7 is not included can also be considered. The HMD 1 can also be considered to have a configuration in which the microphones 6a and 6b or the earphone speakers 5a are not included. A configuration in which the light-emitting unit 4a is not included can also be considered.

Here, the most significant feature of normal HMDs is that they are hands-free and no manipulation input devices corresponding to a keyboard, a mouse, and the like are installed. A user's manipulation is performed, for example, with a button or a switch installed in the HMD or through a sound input, a gesture input, or the like.

As described above, however, manipulation inputs by sounds or gestures are different from manipulations to which users are accustomed and are assumed to cause manipulation burdens or stresses on the user. Further, exact manipulation inputs or text inputs have been difficult with manipulation inputs by sounds or gestures. Furthermore, the same level of operability as in manipulation with a mouse, a keyboard, or the like may not be obtained with manipulation inputs by sounds or gestures.

Accordingly, in view of the foregoing circumstances, a control system according to each embodiment of the present disclosure has been created. The control system according to each embodiment of the present disclosure can virtually associate a manipulation function with a predetermined region of a substantial object.

An example of an internal configuration of the HMD 1 and a manipulation example to which the control system according to the embodiment is applied will be described in sequence below.

<2. Example of Internal Configuration of HMD>

Figure 2:
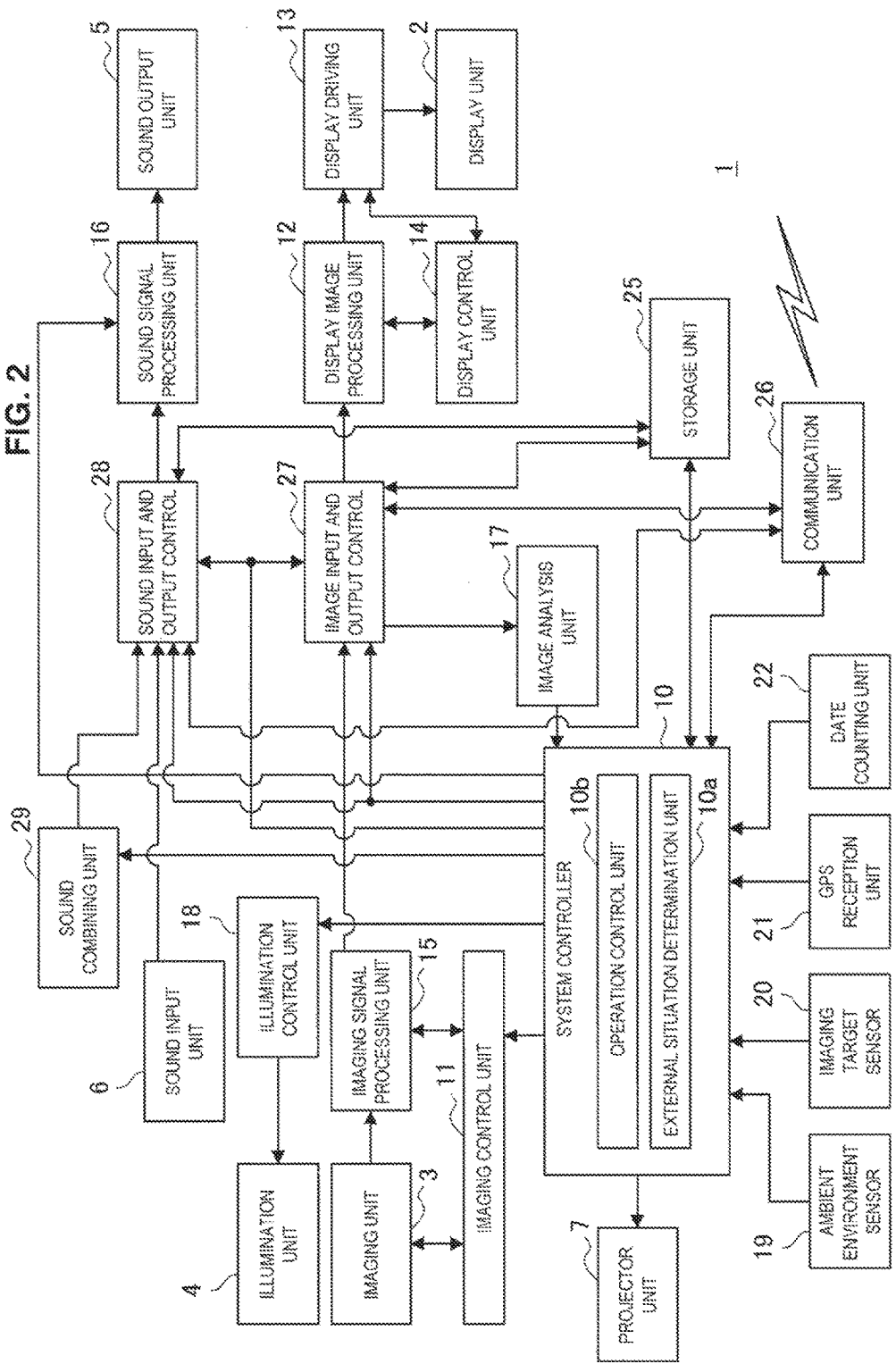
FIG. 2 is a block diagram illustrating an example of the internal configuration of an HMD according to the embodiment.

FIG. 2 is a block diagram illustrating an example of the internal configuration of the HMD 1 according to the embodiment. As illustrated in FIG. 2, the HMD 1 includes a display unit 2, an imaging unit 3, an illumination unit 4, a sound output unit 5, a sound input unit 6, a projector unit 7, a system controller 10, an imaging control unit 11, a display image processing unit 12, a display driving unit 13, a display control unit 14, an imaging signal processing unit 15, a sound signal processing unit 16, an image analysis unit 17, an illumination control unit 18, an ambient environment sensor 19, an imaging target sensor 20, a GPS reception unit 21, a date counting unit 22, a storage unit 25, a communication unit 26, an image input and output control 27, a sound input and output control 28, a sound combining unit 29.

(System Controller)

The system controller 10 is configured by, for example, a microcomputer that includes a central processing unit (CPU), a read-only memory (ROM), a random access memory (RAM), a nonvolatile memory, and an interface and controls each configuration of the HMD 1.

The system controller 10 functions as an external situation determination unit 10a that determines an external situation and an operation control unit 10b that give a control instruction to each unit according to a determination result of the external situation determination unit 10a, as illustrated in FIG. 2.

External Situation Determination Unit

The external situation determination unit 10a acquires external information through the ambient environment sensor 19, the imaging target sensor 20, the GPS reception unit 21, the date counting unit 22, the image analysis unit 17, and the communication unit 26. The external situation determination unit 10a may perform control such that illuminance, luminance, or sensitivity of the projector unit 7, the imaging unit 3, or the display unit 2 is adjusted according to the acquired external information (for example, light intensity or a period of time). The external situation determination unit 10a according to the embodiment functions as a detection unit that detects at least a part of a substantial object at a position at which a user can perform a manipulation as a manipulation region based on the external information.

Specifically, for example, the external situation determination unit 10a (detection unit) extracts a substantial object present within a predetermined distance from the imaging unit 3 based on a captured image (which may be an analysis result obtained by analyzing the captured image by the image analysis unit 17) obtained by the imaging unit 3 imaging the surroundings of the user. The predetermined distance is a distance estimated as a distance in which the user can perform a manipulation (including a touch manipulation and a proximity manipulation) directly or indirectly and is, for example, a distance which a hand of the user reaches or a distance which a manipulator (a pen or an indication rod) held by the user reaches. The substantial object is a target object which exists in the real space which the user can touch. For example, the external situation determination unit 10a (detection unit) extracts a desk present in the vicinity of the user, a notebook-type PC placed on a desk, a music reproduction device, or the like as a substantial object. Then, the external situation determination unit 10a (detection unit) detects a flat region of at least a part of the extracted substantial object as a manipulation region. For example, when a notebook-type PC placed on a desk in a closed state is extracted as the substantial object, the external situation determination unit 10a (detection unit) may detect a top plate portion of the notebook-type PC as a manipulation region.

Operation Control Unit 10b

The operation control unit 10b controls an imaging operation or a display operation according to the acquired external information or a determination result by the external situation determination unit 10a. The operation control unit 10b according to the embodiment functions as a function setting unit that performs setting so that a predetermined function matches (is associated with) the manipulation region detected by the external situation determination unit 10a (detection unit).

Specifically, the operation control unit 10b (function setting unit) associates the manipulation region with any of the various manipulation functions such as a mouse pad function, a keyboard function, a numeric key function, and a content manipulation function. Alternatively, the operation control unit 10b (function setting unit) may associate the manipulation region with a manipulation function similar to the function of the detected substantial object. For example, when a calculator is extracted as the substantial object and a numeric key portion of the calculator is detected as the manipulation region, the operation control unit 10b (function setting unit) associates the numeric key function with the manipulation region.

The operation control unit 10b functions as a control unit that performs control such that a manipulation unit image (manipulation screen) corresponding to the associated manipulation function is displayed to be superimposed and projected to the manipulation region of the detected substantial object. For example, when a part of a desk is detected as a manipulation region and a keyboard function is associated with the manipulation region, the operation control unit 10b (control unit) controls the display unit 2 or the projector unit 7 such that a keyboard image is displayed to be superimposed and projected to the manipulation region. The operation control unit 10b can also perform control such that the size of the displayed and projected manipulation unit image matches the size of the manipulation region.

The operation control unit 10b functions as a control unit that performs a function matched (associated) with a manipulation region based on a positional relation between the manipulation region and a manipulator. Here, the manipulator may be a part of the body of the user such as a finger or a pen or indication rod held by the user.

More specifically, the operation control unit 10b (control unit) recognizes the positional relation between the manipulation region and the manipulator based on external information (for example, a captured image) and determines whether the manipulator overlaps the manipulation region for a predetermined time. Then, when the manipulator overlaps the manipulation region for the predetermined time, the operation control unit 10b (control unit) performs the manipulation function associated with the manipulation region, that is, receives a manipulation input performed by the user.

For example, when the mouse pad function is associated with the manipulation region, the operation control unit 10b (control unit) controls a display position of a mouse pointer displayed in the display unit 2 according to a motion of the user's finger on the manipulation region. For example, when the keyboard function is associated with the manipulation region, the operation control unit 10b (control unit) executes a text input based on a relation between the position of each key of the manipulation region and the position of the user's finger.

Thus, when the user manipulates the hands-free HMD 1, the user can perform a manipulation input of touching a substantial object present in the real space. The user can perform a manipulation input, such as a mouse manipulation or a keyboard input, with a motion to which users are generally accustomed. When a predetermined flat region of a substantial object is utilized as a manipulation unit, it is not necessary to connect the substantial object to the HMD 1 electrically or physically, and thus communication connection or wiring between the substantial object and the HMD 1 is not necessary. Further, it is not necessary to transmit input data from the substantial object to the HMD 1 either. Therefore, even when the substantial object is, for example, a wireless keyboard or mouse, it is not necessary to feed power. Even when the substantial object is a broken keyboard or mouse, the broken keyboard or mouse can be used as a manipulation input device as long as a manipulation region can be detected by the HMD 1 and can be associated with a manipulation function. Therefore, ultimate recycling can be realized.

(Imaging Unit)

The imaging unit 3 includes a lens system that includes an imaging lens 3a, a diaphragm, a zoom lens, and a focus lens, a driving system that enables the lens system to execute a focus operation or a zoom operation, and a solid-state image sensor array that photoelectrically converts imaging light obtained with the lens system to generate an imaging signal. The solid-state image sensor array may be realized by, for example, a charge coupled device (CCD), a sensor array, or a complementary metal oxide semiconductor (CMOS) sensor array. As illustrated in FIG. 1, since the imaging lens 3a is disposed toward the front side to execute imaging with a view direction of the user set as a subject direction when the HMD 1 is mounted on the user, the imaging unit 3 can image a range including the field of vision that the user sees through the display unit 2.

(Imaging Signal Processing Unit)

The imaging signal processing unit 15 includes a sample-hold and automatic gain control (AGC) circuit that performs gain adjustment or waveform shaping on a signal obtained by a solid-state image sensor of the imaging unit 3 or a video analog-to-digital (A-to-D) converter. Thus, the imaging signal processing unit 15 obtains an imaging signal as digital data. The imaging signal processing unit 15 performs a white balance process, a luminance process, a color signal process, a blur correction process, or the like on the imaging signal.

(Imaging Control Unit)

The imaging control unit controls the operations of the imaging unit 3 and the imaging signal processing unit 15 based on an instruction from the system controller 10. For example, the imaging control unit 11 controls ON and OFF of the operations of the imaging unit 3 and the imaging signal processing unit 15. The imaging control unit 11 is considered to perform control (motor control) on the imaging unit 3 in order to execute operations such as auto-focus, automatic exposure adjustment, diaphragm adjustment, and zoom. The imaging control unit 11 includes a timing generator and controls signal processing operations of the video A-to-D converter and the solid-state image sensor and the sample-hold and AGC circuit of the imaging signal processing unit 15 based on a timing signal generated by the timing generator. Variable control of an imaging frame rate is considered to be performed by the timing control.

The imaging control unit 11 performs control of imaging sensitivity or signal processing in the solid-state imaging element and the imaging signal processing unit 15. For example, as the control of the imaging sensitivity, gain control of a signal read from the solid-state image sensor can be performed. Alternatively, control of various coefficients of imaging signal processing at a digital data stage, black level setting control, correction amount control in a blur correction process, or the like can be performed. For the imaging sensitivity, for example, entire sensitivity adjustment in which a wavelength band is not particularly considered or sensitivity adjustment (for example, imaging in which a specific wavelength band is cut) in which imaging sensitivity of a specific wavelength band is adjusted in, for example, an infrared region or an ultraviolet region can be performed. Sensitivity adjustment according to a wavelength can be performed through inversion of a wavelength filter in the imaging lens system or a wavelength filter calculation process on an imaging signal. In this case, the imaging control unit 11 can perform sensitivity control through insertion control of a wavelength filter, designation of a filter calculation coefficient, or the like.

(Image Input and Output Control)

The imaging signal (image data obtained by imaging) imaged by the imaging unit 3 and processed by the imaging signal processing unit 15 is supplied to the image input and output control 27. The image input and output control 27 controls transmission of the image data under the control of the system controller 10. That is, transmission of the image data is controlled among an imaging system (the imaging signal processing unit 15), a display system (the display image processing unit 12), the storage unit 25, and the communication unit 26.

For example, the image input and output control 27 performs an operation of supplying the image data which is the imaging signal processed by the imaging signal processing unit 15 to the display image processing unit 12, the storage unit 25, or the communication unit 26.

The image input and output control 27 performs an operation of supplying, for example, the image data reproduced from the storage unit 25 to the display image processing unit 12 or the communication unit 26. The image input and output control 27 performs an operation of supplying, for example, the image data received by the communication unit 26 to the display image processing unit 12 or the storage unit 25.

(Display Image Processing Unit)

The display image processing unit 12 is considered as, for example, a so-called video processor and is considered to be a unit which can perform various display processes on the supplied image data. For example, luminance level adjustment, color correction, contrast adjustment, or sharpness (contour enhancement) adjustment of the image data can be performed.

(Display Driving Unit)

The display driving unit 13 includes a pixel driving circuit that displays the image data supplied from the display image processing unit 12 on the display unit 2 considered as, for example, a liquid crystal display. That is, display is performed by applying a driving signal based on a video signal to each of the pixels arranged in a matrix form in the display unit 2 at predetermined horizontal and vertical driving timings. The display driving unit 13 can control the transmittance of each of the pixels of the display unit 2 such that the pixels enter a through state. The display driving unit 13 may allow a part of the display unit 2 to enter the through state and display AR information in the part thereof.

(Display Control Unit)

The display control unit 14 controls a processing operation of the display image processing unit 12 or an operation of the display driving unit 13 under the control of the system controller 10. Specifically, the display control unit 14 performs control such that the display image processing unit 12 performs the luminance level adjustment and the like on the image data described above. The display control unit 14 performs control such that the display driving unit 13 changes the through state and an image display state of the display unit 2.

(Sound Input Unit)

The sound input unit 6 includes the microphones 6a and 6b illustrated in FIG. 1, and a microphone amplifier unit and an A-to-D converter that amplify and process sound signals obtained by the microphones 6a and 6b. The sound input unit 6 outputs sound data to the sound input and output control 28.

(Sound Input and Output Control)

The sound input and output control 28 controls transmission of the sound data under the control of the system controller 10. Specifically, the sound input and output control 28 controls transmission of the sound signals among the sound input unit 6, the sound signal processing unit 16, the storage unit 25, and the communication unit 26. For example, the sound input and output control 28 performs an operation of supplying the sound data obtained by the sound input unit 6 to the sound signal processing unit 16, the storage unit 25, or the communication unit 26.

The sound input and output control 28 performs an operation of supplying, for example, the sound data reproduced by the storage unit 25 to the sound signal processing unit 16 or the communication unit 26. The sound input and output control 28 performs an operation of supplying, for example, the sound data received by the communication unit 26 to the sound signal processing unit 16 or the storage unit 25.

(Sound Signal Processing Unit)

The sound signal processing unit 16 is formed by, for example, a digital signal processor or a D-to-A converter. The sound signal processing unit 16 is supplied with the sound data obtained by the sound input unit 6 or the sound data from the storage unit 25 or the communication unit 26 via the sound input and output control 28. The sound signal processing unit 16 performs a process such as volume adjustment, sound quality adjustment, or an acoustic effect on the supplied sound data under the control of the system controller 10. The processed sound data is converted into an analog signal to be supplied to the sound output unit 5. The sound signal processing unit 16 is not limited to the configuration in which the digital signal processing is performed, but may perform signal processing using an analog amplifier or an analog filter.

(Sound Output Unit)

The sound output unit 5 includes one pair of earphone speakers 5a illustrated in FIG. 1 and amplifier circuits for the earphone speakers 5a. The sound output unit 5 may be configured as a so-called bone conduction speaker. The user can hear an external sound through the sound output unit 5, hear a sound reproduced by the storage unit 25, or hear a sound received by the communication unit 26.

(Storage Unit)

The storage unit 25 is considered to be a unit that records and reproduces data on a predetermined recording medium. The storage unit 25 is realized as, for example, a hard disk drive (HDD). Of course, the recording medium can be considered as any of various media such as a solid-state memory such as a flash memory, a memory card including a fixed memory, an optical disc, a magneto-optical disc, and a hologram memory. The storage unit 25 may be considered to have a configuration in which recording and reproduction can be performed according to an adopted recording medium.

The storage unit 25 is supplied with image data captured by the imaging unit 3 and processed as an imaging signal by the imaging signal processing unit 15 or with image data received by the communication unit 26 via the image input and output control 27. The storage unit 25 is supplied with sound data obtained by the sound input unit 6 or sound data received by the communication unit 26 via the sound input and output control 28.

The storage unit 25 records the supplied image data and sound data by performing an encoding process on the image data and the sound data for the purpose of recording on a recording medium and recording the image data and the sound data on the recording medium under control of the system controller 10. The storage unit 25 reproduces the image data and the sound data from the recording medium under the control of the system controller 10. The reproduced image data is output to the image input and output control 27 and the reproduced sound data is output to the sound input and output control 28.

(Communication Unit)

The communication unit 26 performs transmission and reception of data with an external device. The communication unit 26 is an example of the configuration for acquiring external information. The communication unit 26 may be configured to perform network communication through near field communication with, for example, a network access point in conformity with a scheme such as wireless LAN or Bluetooth or may be configured to perform wireless communication directly with an external device having a corresponding communication function.

The external device is assumed to be any device having information processing and communication functions, such as a computer device, a PDA, a portable telephone terminal, a smartphone, a video device, an audio device, and a tuner device. Also, the communication target external device is assumed to be a terminal device, a server device, or the like connected to a network such as the Internet. By setting a contactless communication IC card including an IC chip, a two-dimensional barcode such as a QR code, a hologram memory, or the like as an external device, the communication unit 26 can also be considered to read information from such an external device. Another HMD 1 is also assumed as an external device.

The communication unit 26 is supplied with image data captured by the imaging unit 3 and processed as an imaging signal by the imaging signal processing unit 15 and image data reproduced by the storage unit 25 via the image input and output control 27. The communication unit 26 is supplied with sound data obtained by the sound input unit 6 or sound data reproduced by the storage unit 25 via the sound input and output control 28.

The communication unit 26 performs an encoding process, a modulation process, and the like on the supplied image data and sound data for transmission and transmits the processed image data and sound data to an external device under the control of the system controller 10. The communication unit 26 performs a data reception operation from an external device. The received and demodulated image data is output to the image input and output control 27 and the received and demodulated sound data is output to the sound input and output control 28.

(Sound Combining Unit)

The sound combining unit 27 performs sound combining under the control of the system controller 10 and outputs the sound signal. The sound signal output from the sound combining unit 27 is supplied to the sound signal processing unit 16 via the sound input and output control 28 to be processed, and then is supplied to the sound output unit 5 to be output as a sound to the user.

(Illumination Unit and Illumination Control Unit)

The illumination unit 4 includes a light-emitting unit 4a illustrated in FIG. 1 and a light-emitting circuit that allows the light-emitting unit 4a (for example, an LED) to emit light. The illumination control unit 18 allows the illumination unit 4 to perform a light emitting operation under the control of the system controller 10. The light-emitting unit 4a of the illumination unit 4 is mounted to perform illumination on the front side, as illustrated in FIG. 1, and thus the illumination unit 4 performs an illumination operation in a visual field direction of the user.

(Ambient Environment Sensor)

The ambient environment sensor 19 is an example of the configuration for acquiring external information. Specifically, for example, the ambient environment sensor 19 is assumed to be an illuminance sensor, a temperature sensor, a humidity sensor, or a pressure sensor. The ambient environment sensor 19 is considered to be a sensor that obtains information to detect ambient brightness, temperature, humidity, weather, or the like as the ambient environment of the HMD 1.

(Imaging Target Sensor)

The imaging target sensor 20 is an example of the configuration for acquiring external information. Specifically, the imaging target sensor 20 is a sensor that detects information regarding an imaging target which is a subject of an imaging operation by the imaging unit 3. For example, a sensor that detects information such as a specific wavelength of infrared light or energy emitted from an imaging target, such as a distance measurement sensor detecting information regarding a distance from the HMD 1 to the imaging target or an infrared sensor such as a pyroelectric sensor, is assumed. In the case of the pyroelectric sensor, for example, whether the imaging target is a living body such as a person or an animal can be detected. A sensor that detects information regarding a specific wavelength of ultraviolet light or energy emitted from the imaging target, such as any of the various ultraviolet (UV) sensors, is also assumed. In this case, for example, whether the imaging target is a fluorescent material or a phosphor can be detected or the amount of external ultraviolet light necessary for anti-sunburn measures can be detected.

(GPS Reception Unit)

The GPS reception unit 21 is an example of the configuration for acquiring external information. Specifically, the GPS reception unit 21 receives radio waves from satellites of the Global Positioning System (GPS) and outputs information regarding a latitude and longitude as a current position.

(Date Counting Unit)

The date counting unit 22 is an example of the configuration for acquiring external information. The date counting unit 22 counts a date (year, month, day, hour, minute, and second) as a so-called clock unit and outputs current date information.

(Image Analysis Unit)

The image analysis unit 17 is an example of the configuration for acquiring external information. Specifically, the image analysis unit 17 analyzes the image data and obtains information regarding an image included in the image data. The image analysis unit 17 is supplied with image data via the image input and output control 27. The image data which is a target of the image analysis in the image analysis unit 17 is the image data which is a captured image obtained by the imaging unit 3 and the imaging signal processing unit 15, the image data received by the communication unit 26, or the image data reproduced from the recording medium by the storage unit 25.

The internal configuration of the HMD 1 according to the embodiment has been described in detail above. The ambient environment sensor 19, the imaging target sensor 20, the GPS reception unit 21, the date counting unit 22, the image analysis unit 17, and the communication unit 26 have been described as the configuration for acquiring the external information, but not all of them are necessarily included. Another sensor such as a sound analysis unit that detects and analyzes an ambient sound may be installed.

<3. Embodiments>

As described above, the HMD 1 according to the embodiment detects at least a part of a substantial object present at a position at which the user can perform a manipulation as a manipulation region and matches a predetermined function to the detected manipulation region. Then, the HMD 1 receives a manipulation input by the user by recognizing the positional relation between the detected manipulation region and a manipulator based on a captured image or the like and performing control such that the function matched with the manipulation region is performed. Thus, the HMD 1 according to the embodiment can use the substantial object which is not connected electrically and physically but is present in the real space, as a manipulation input device. Hereinafter, a plurality of embodiments will be described in detail in regard to manipulation examples of the HMD 1 according to the embodiment.

[3-1. First Embodiment]

Figure 3:
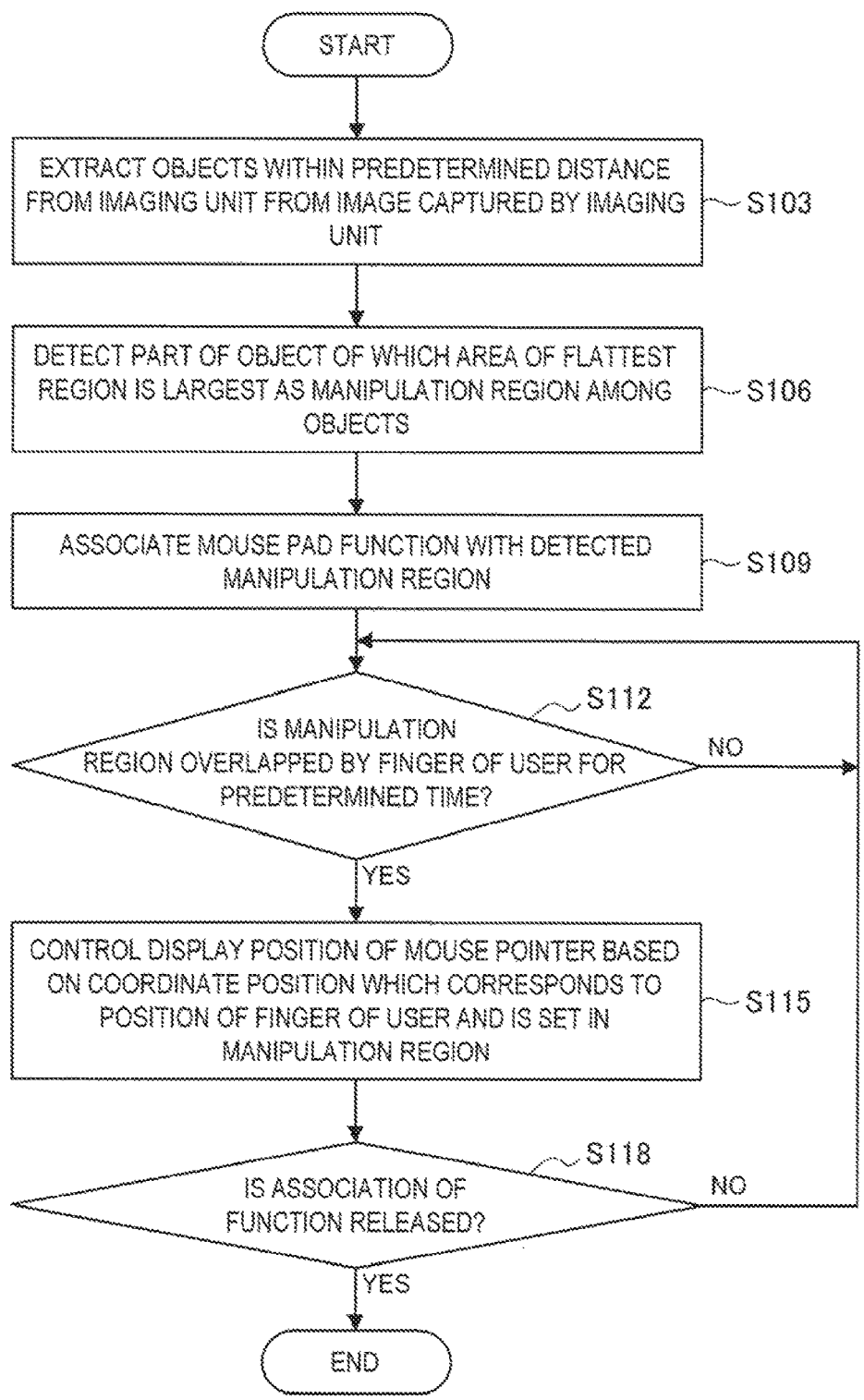
FIG. 3 is a flowchart illustrating a process of a control operation according to a first embodiment.

A control operation according to a first embodiment will be described with reference to FIG. 3. FIG. 3 is a flowchart illustrating a process of the control operation according to the first embodiment.

As illustrated in FIG. 3, in step S103, first, the external situation determination unit 10a (detection unit) first extracts a substantial object (hereinafter referred to as an object) present within the predetermined distance from the imaging unit 3 from a captured image captured by the imaging unit 3. In the extraction of the object, a scheme of dynamically generating an environment map that expresses a 3-dimensional position of an object present in the real space may be used by applying a technology called SLAM capable of simultaneously estimating the position or posture of a camera (the imaging unit 3) and the positions of feature points appearing in a captured image. A basic principle of the simultaneously localization and mapping (SLAM) technology using a single camera is described in JP 2011-159163A or JP 2008-304268A.

The external situation determination unit 10a (detection unit) may perform pattern matching with the captured image with reference to a pattern (3-dimensional data or the like) of the object stored in advance in the storage unit 25 to extract each object.

When the plurality of imaging lenses 3a are present (in the case of stereo cameras), the external situation determination unit 10a (detection unit) may extract the object based on stereovision or find a distance from the object.

The external situation determination unit 10a (detection unit) may also comprehend the distance between the imaging unit 3 and the object based on information acquired by the imaging target sensor 20 in addition to analysis of the captured image. The external situation determination unit 10a may extract a plurality of objects present within the predetermined distance from the imaging unit 3.

Figure 4:
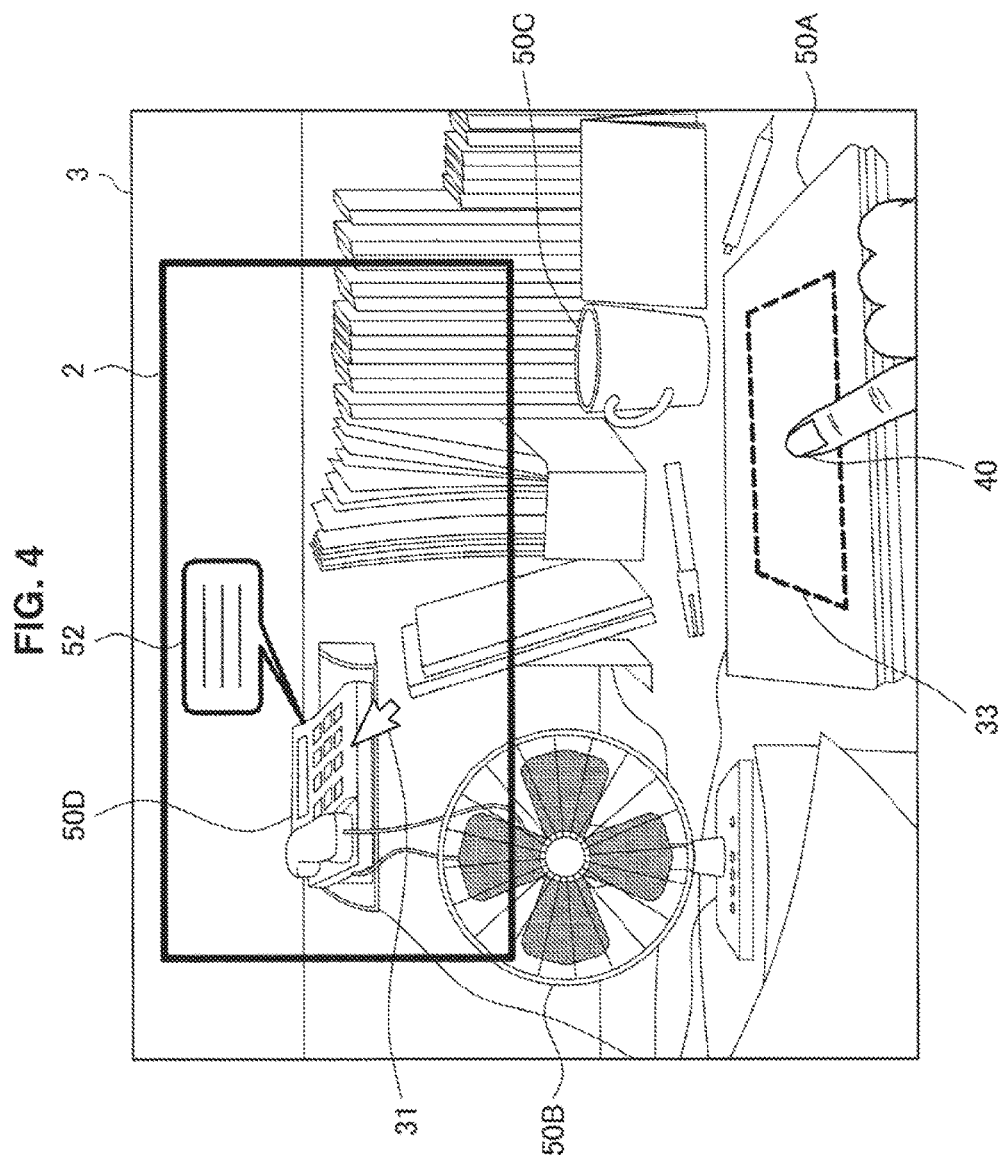
FIG. 4 is a diagram for describing the control operation according to the first embodiment.

Here, a diagram for describing a control operation according to the first embodiment is illustrated in FIG. 4. In an example illustrated in FIG. 4, the display unit 2 enters the through state and the user is viewing the scene of the real space through the transparent display unit 2. The operation control unit 10b may perform control such that a part of a captured image of the real space captured by the imaging unit 3 is displayed on the display unit 2 in real time and is viewed to be almost similar to the case of the through state.

In the example illustrated in FIG. 4, an imaging range of the imaging unit 3 is broader than the range of the field of vision of the user in which the object is viewed through the display unit 2. In order to image the object in the range broader than the range of the field of vision of the user, the imaging unit 3 may also use a wide-angle lens as an imaging lens or include a plurality of imaging lenses. Thus, the imaging unit 3 can also image the object which is close to the user and is viewed through the display unit 2 out of the field of vision of the user. Then, the external situation determination unit 10a (detection unit) extracts, for example, objects 50A, 50B, and 50C within a distance which a hand of the user reaches based on a captured image captured by the imaging unit 3.

Subsequently, in step S106, the external situation determination unit 10a (detection unit) detects at least a part of the object of which an area of a flattest region is largest among the extracted objects as a manipulation region. The manipulation region is utilized as a user's manipulation space. The external situation determination unit 10a (detection unit) determines the object of which the area of the flattest region is largest by normalizing and comparing the areas of the flat regions of the objects using the distances up to the extracted objects.

For example, in the example illustrated in FIG. 4, the object 50A has the largest flat area (top plate portion) among the extracted object 50A (a notebook-type PC in a folded state), object 50B (a table fan), and object 50C (a cup). In this case, the external situation determination unit 10a (detection unit) detects the top plate portion of the object 50A as a manipulation region 33.

Next, in step S109, the operation control unit 10b associates a predetermined manipulation function, for example, a mouse pad function, with the manipulation region detected by the external situation determination unit 10a. More specifically, the operation control unit 10b assumes a rectangular mouse pad and sets the coordinates of the rectangular mouse pad in the manipulation region 33 illustrated in FIG. 4.

When the operation control unit 10b associates the mouse pad function, the operation control unit 10b displays a mouse pointer 31 on the display unit 2. In the example illustrated in FIG. 4, most of the display unit 2 is in the through state and the mouse pointer 31 is displayed in a part of the display unit 2. The mouse pointer 31 is used when an object (for example, an object 50D) present in the real space is selected, as illustrated in FIG. 4. The operation control unit 10b displays information regarding the object selected with the mouse pointer 31 as AR information 52 to be superimposed on the display unit 2.

Subsequently, in step S112, the operation control unit 10b recognizes a finger of the user from an image feature amount (an image feature amount of the finger) based on the captured image and determines whether the finger overlaps the manipulation region for a predetermined time (for example, about 0.5 seconds).

Next, when the operation control unit 10b determines that the finger overlaps the manipulation region for the predetermined time (S112/YES), the operation control unit 10b controls the display position of the mouse pointer 31 based on a coordinate position which corresponds to the position of the finger and is set in the manipulation region in step S115.

Thus, the user can control the display position of the mouse pointer 31 by moving a finger 40 in the manipulation region 33 of the object 50A with which the mouse pad function is associated. At this time, since the user can control the display position of the mouse pointer 31 while touching the manipulation region 33 with the finger 40, the user can perform a manipulation with a sense more similar to a normal mouse manipulation than a manipulation of moving the finger in the air. As illustrated in FIG. 4, since the manipulation region 33 is out of the field of vision of the user (the display unit 2), the user can blindly manipulate the display position of the mouse pointer 31 while viewing the display unit 2.

Then, in step S118, the operation control unit 10b determines whether the association of the function is released. When the association of the function is released (S118/YES), the present operation process ends. For example, the operation control unit 10b may determine that the association of the function is released when an application using the associated manipulation function ends. The operation control unit 10b may determine that the association of the function is released when the user moves. In this case, after the user moves to another location, the operation control unit 10b may perform the processes of S103 to S109 again to associate the manipulation function with a newly detected manipulation region. The movement of the user can be determined based on current position information acquired by the GPS reception unit 21 installed in the HMD 1 or a value acquired by an acceleration sensor (not illustrated).

[3-2. Second Embodiment]

In the above-described first embodiment, the manipulation region 33 is out of the field of the vision of the user (the display unit 2), but the scope of the present disclosure, of course, includes a case in which the manipulation region 33 is included in the field of vision of the user (the display unit 2). Hereinafter, a second embodiment in which the manipulation region 33 is included in the field of vision of the user (the display unit 2) will be described specifically with reference to FIGS. 5 and 6.

Figure 5:
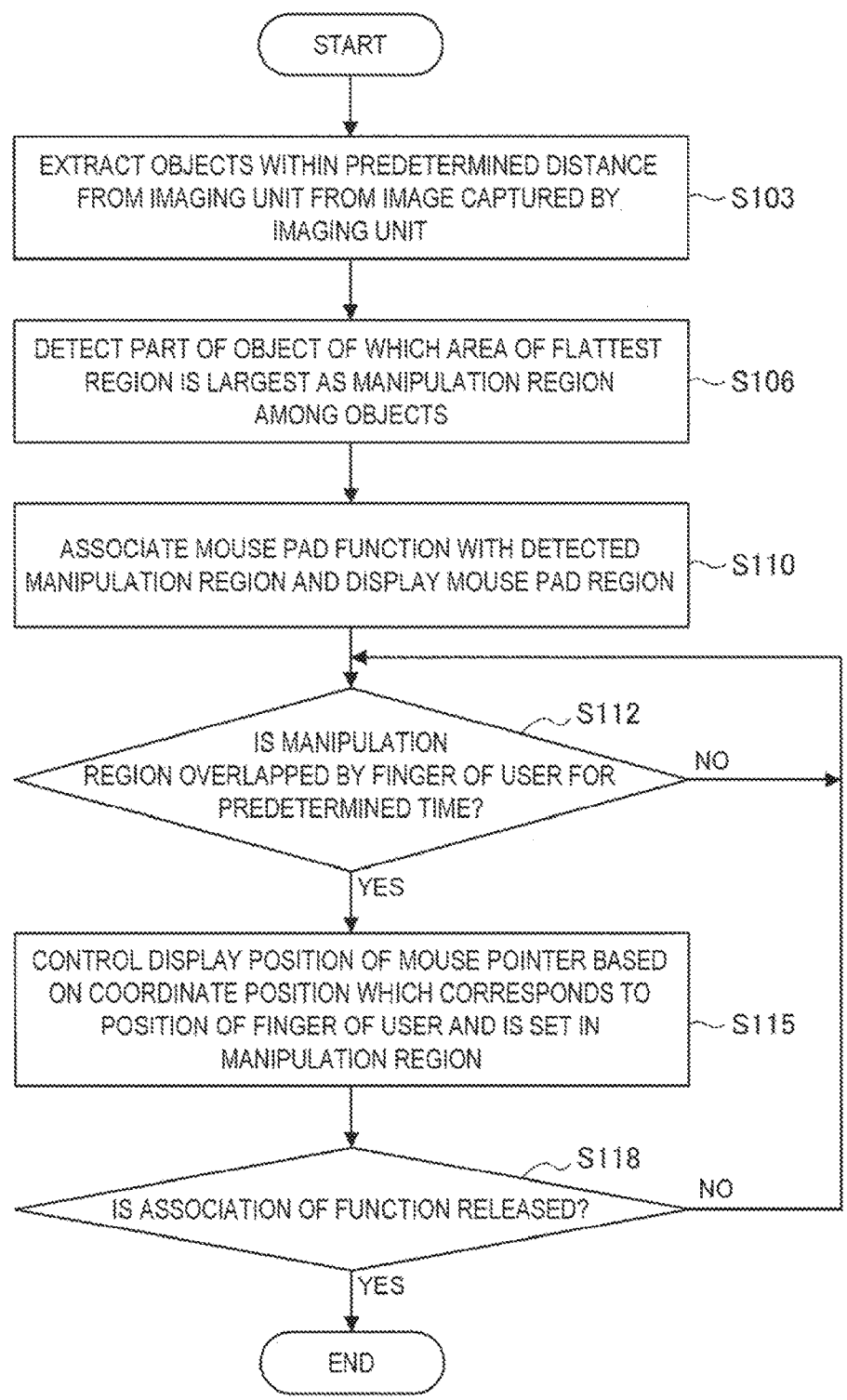
FIG. 5 is a flowchart illustrating a process of a control operation according to a second embodiment.

FIG. 5 is a flowchart illustrating a process of a control operation according to the second embodiment. In steps S103 and S106 illustrated in FIG. 5, the external situation determination unit 10a (detection unit) performs the same processes as in the steps described with reference to FIG. 3.

Figure 6:
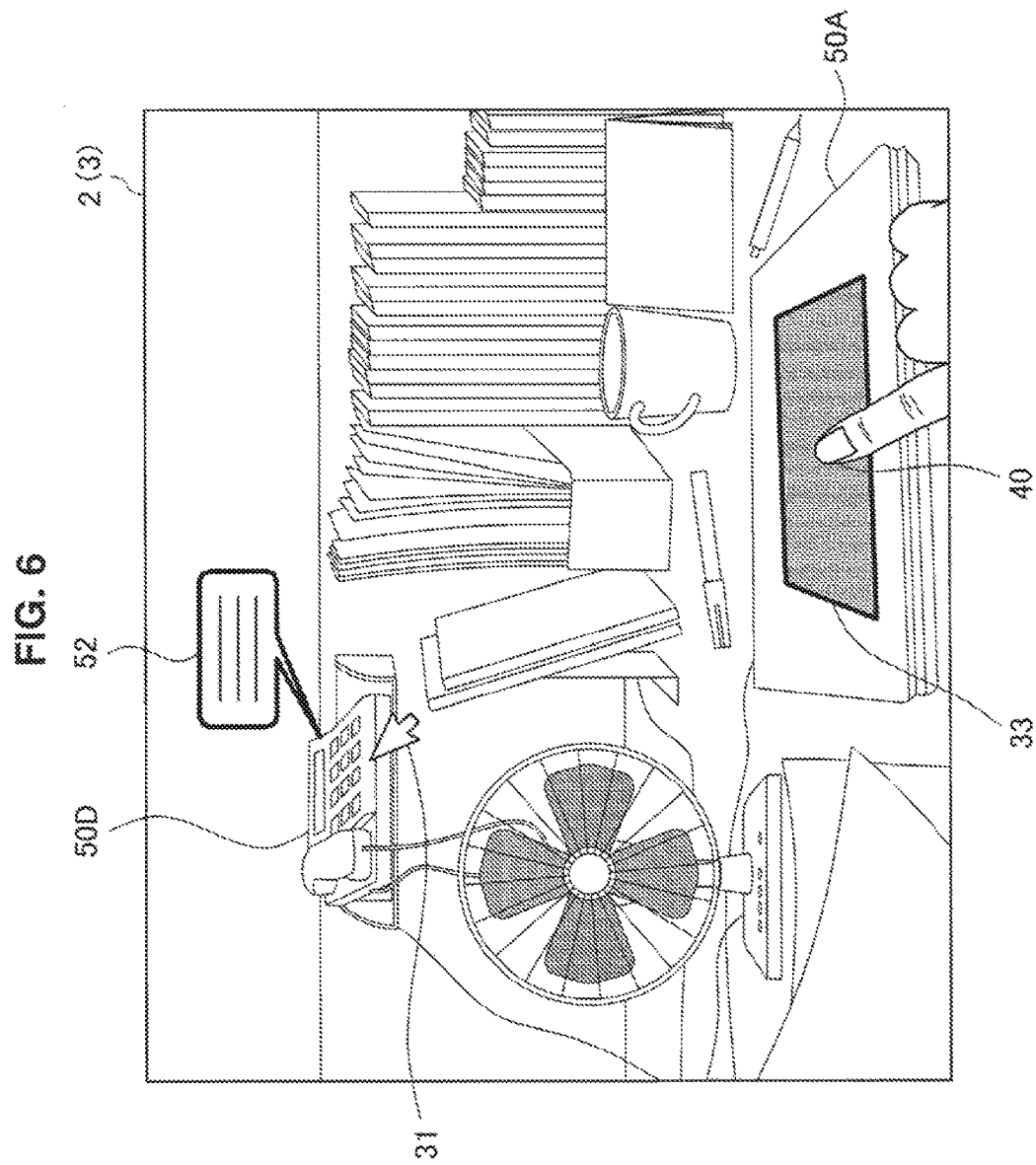
FIG. 6 is a diagram for describing the control operation according to the second embodiment.

Here, a diagram for describing the control operation according to the second embodiment is illustrated in FIG. 6. In an example illustrated in FIG. 6, an object 50A present within the range of the field of vision of the user viewed through the transparent display unit 2 is determined as an object of which an area of a flattest region is largest, and a part (top plate portion) of the object 50A is detected as a manipulation region 33. In the example illustrated in FIG. 6, the imaging unit 3 images the range including the field of vision of the user viewed through the display unit 2 and outputs the range of the field of the vision as a captured image.

Next, in step S110, the operation control unit 10*b* associates a predetermined manipulation function, for example, a step mouse pad function with the manipulation region detected by the external situation determination unit 10*a*, as in the case described in S109 of FIG. 3. The operation control unit 10*b* assumes, for example, a rectangular mouse pad and sets the coordinates of the rectangular mouse pad in the manipulation region 33 illustrated in FIG. 6. When the operation control unit 10*b* associates the mouse pad function, the operation control unit 10*b* displays a mouse pointer 31 on the display unit 2. In the example illustrated in FIG. 6, most of the display unit 2 is in the through state and the mouse pointer 31 is displayed in a part of the display unit 2. As in the first embodiment, the mouse pointer 31 is used when an object (for example, an object 50D) present in the real space is selected. The operation control unit 10*b* displays information regarding the object selected with the mouse pointer 31 as AR information 52 to be superimposed on the display unit 2.

The operation control unit 10*b* controls the display control unit 14 such that a manipulation unit image (manipulation screen) corresponding to the manipulation function associated with the manipulation region is displayed on the display unit 2 to be superimposed on the manipulation region. Specifically, for example, the operation control unit 10*b* performs the control such that the image of the rectangular mouse pad is displayed to be superimposed on the manipulation region 33, as illustrated in FIG. 6. Thus, the user can view the manipulation region 33.

Since the same processes as in the steps described with reference to FIG. 3 are performed in the subsequent steps S112 to S118, the description thereof will be omitted herein.

As described above, in the second embodiment, the manipulation region 33 is included in the field of vision of the user (the display unit 2) and the manipulation unit image corresponding to the associated manipulation function is displayed on the display unit 2 to be displayed to be superimposed on the manipulation region 33. Thus, the user can perform a manipulation while viewing the manipulation region 33. Since the manipulation unit image (a mouse pad image, a keyboard image, a numeric key image, or the like) corresponding to the manipulation function is displayed, the user can intuitively comprehend which manipulation function is associated.

[3-3. Third Embodiment]

In the above-described second embodiment, the manipulation unit image displayed to be superimposed on the manipulation region 33 is displayed on the display unit 2, but the scope of the present disclosure also includes a case in the manipulation unit image is projected onto the manipulation region 33. Hereinafter, a third embodiment in which the manipulation unit image is projected onto the manipulation region 33 will be described specifically with reference to FIG. 7.

Figure 7:
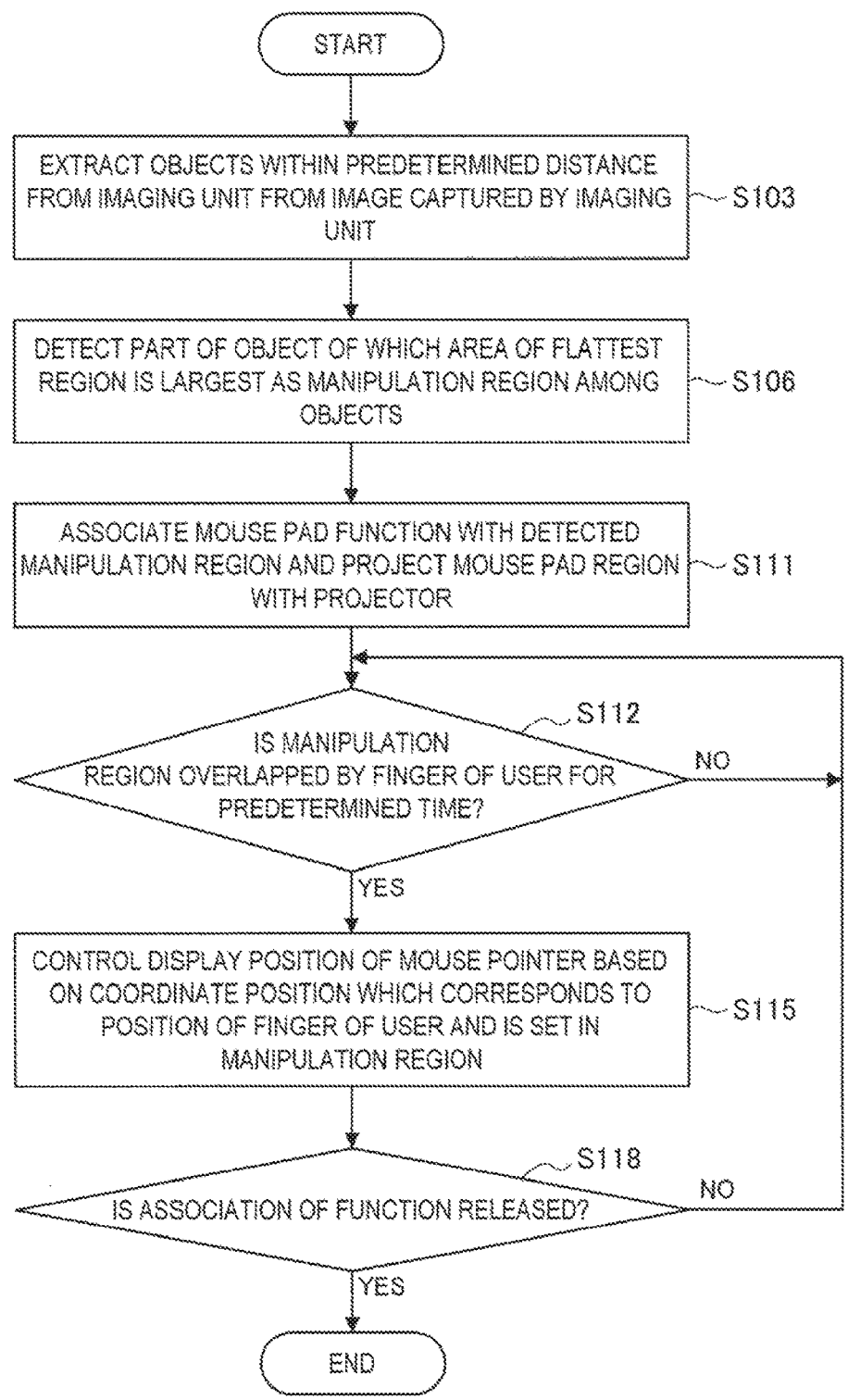
FIG. 7 is a flowchart illustrating a process of a control operation according to a third embodiment.

FIG. 7 is a flowchart illustrating a process of a control operation according to the third embodiment. In steps S103 and S106 illustrated in FIG. 7, the external situation determination unit 10*a* (detection unit) performs the same processes as in the steps described with reference to FIG. 3.

Next, in step S111, the operation control unit 10*b* may associate a predetermined manipulation function, for example, a mouse pad function as in the case described in step S110 of FIG. 5, with the manipulation region detected by the external situation determination unit 10*a*.

The operation control unit 10*b* controls the projector unit 7 such that a manipulation unit image (manipulation screen) corresponding to the manipulation function associated with the manipulation region is projected onto the manipulation region. Specifically, for example, the operation control unit 10*b* controls the projector unit 7 such that an image of the rectangular mouse pad is projected onto the manipulation region 33. Thus, the user can view the manipulation region 33.

Since the same processes as in the steps described with reference to FIG. 3 are performed in the subsequent steps S112 to S118, the description thereof will be omitted herein.

As described above, in the third embodiment, the user can intuitively comprehend the manipulation region 33 when the manipulation unit image is projected onto the manipulation region 33.

[3-4. Fourth Embodiment]

In each of the above-described embodiments, the manipulation region has been detected from the object of which the area of the flattest region is largest among the extracted objects, but the scope of the present disclosure also includes a case in which a manipulation region is detected preferentially from an object having a manipulator (manipulation unit) such as a physical switch, button, or the like for manipulation. Hereinafter, a fourth embodiment in which a manipulation region is detected from an object having a physical manipulator for manipulation will be described specifically with reference to FIGS. 8 and 9.

Figure 8:
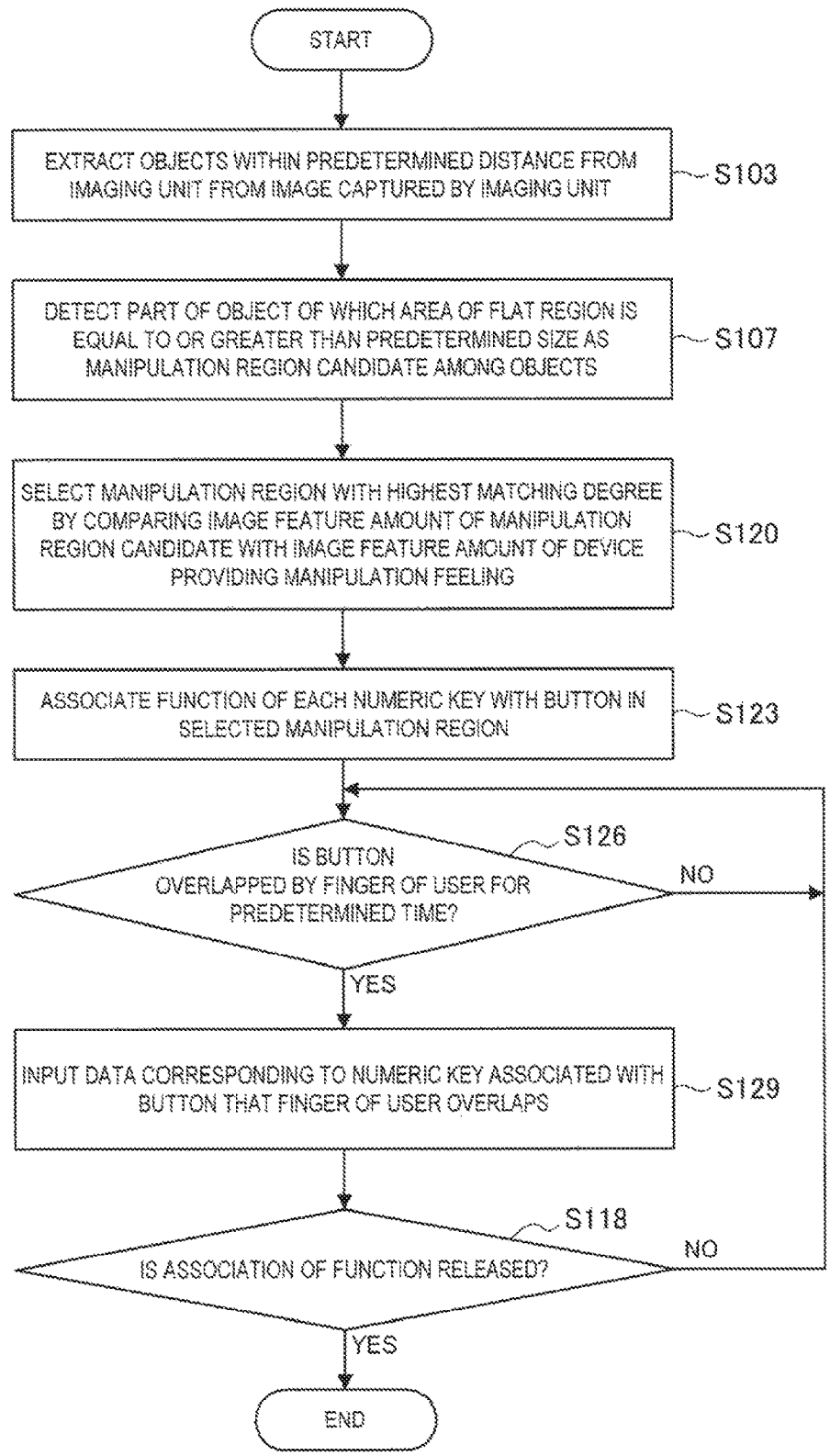
FIG. 8 is a flowchart illustrating a process of a control operation according to a fourth embodiment.

FIG. 8 is a flowchart illustrating a process of a control operation according to the fourth embodiment. In step S103 illustrated in FIG. 8, the external situation determination unit 10*a* (detection unit) first extracts a substantial object as in the above-described same step.

Subsequently, in step S107, the external situation determination unit 10*a* (detection unit) detects a part of an object of which a flat region has a size equal to or greater than a predetermined size as a manipulation region candidate in the extracted object. For example, in an example illustrated in FIG. 9, an object 50A (notebook-type PC), an object 50E (desk), and an object 50F (calculator) are determined as the object of which the flat region has the size equal to or greater than the predetermined size among the objects extracted based on the captured image. Parts of the flat regions of the objects are detected as manipulation region candidates 35A (top plate portion), 35E (a part of the desk), and 35F (a numeric key portion). In the example illustrated in the upper portion of FIG. 9, dashed lines indicating the manipulation region candidates 35A, 35E, and 35F are illustrated for description, but such dashed lines are not displayed on the display unit 2 and the user views only a scene of the real space through the transparent display unit 2.

Next, in step S120, the operation control unit 10*b* selects a manipulation region with the highest matching degree by comparing an image feature amount of the manipulation region candidate with an image feature amount of a device providing a manipulation feeling and stored in advance in the storage unit 25. For example, when the image feature amounts of a keyboard, a mouse, a numeric key, and the like are stored as the image feature amount of devices providing a manipulation feeling in the storage unit 25, the operation control unit 10*b* can select the manipulation region candidate 35F of the calculator (object 50F) illustrated in the upper portion of FIG. 9 as a manipulation region 33F.

Figure 9:
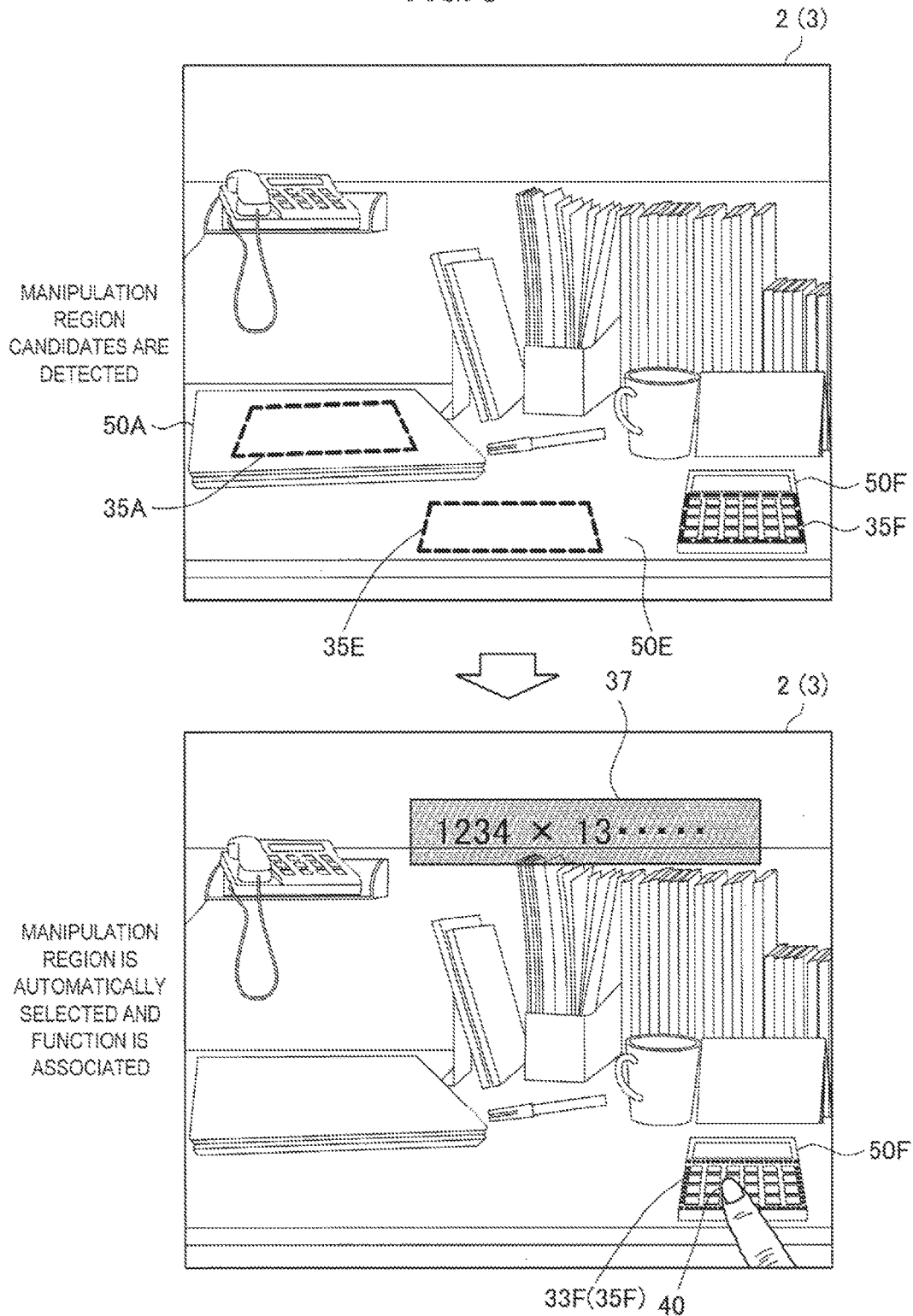
FIG. 9 is a diagram for describing the control operation according to the fourth embodiment.

Subsequently, in step S123, the operation control unit 10b associates a predetermined manipulation function, for example, a numeric key function, with each button (or a physical manipulator such as a switch or a key) in the selected manipulation region (for example, the manipulation region 33F illustrated in the lower portion of FIG. 9). Here, the associated manipulation function is a function (a corresponding text data input function in the case of a letter key, a corresponding number data input function in a case of a number key, or the like) according to each button (manipulator) in the manipulation region 33F. The operation control unit 10b can determine a function according to each button based on an image analysis result of each button (manipulator) in the selected manipulation region.

Subsequently, in step S126, the operation control unit 10b recognizes a finger 40 of the user from the image feature amount or the like based on a captured image including the range of the field of vision of the user and determines whether the button in the manipulation region 33F is overlapped by the finger 40 for a predetermined time (for example, about 0.5 seconds).

Next, when the operation control unit 10b determines that the button in the manipulation region 33F is overlapped by the finger 40 for the predetermined time (S126/YES), the operation control unit 10b performs the key function associated with the button in the manipulation region 33F and corresponding to the position of the finger 40 in step S129. That is, data corresponding to the numeric key associated with the button that the finger 40 overlaps is received as an input value. At this time, the operation control unit 10b may control the display control unit 14 such that the data received as the input value is displayed on the display unit 2. For example, as illustrated in the lower portion of FIG. 9, the operation control unit 10b displays an image 37 indicating the data received as the input value in a part of the display unit 2. In the example illustrated in the lower portion of FIG. 9, a dotted line indicating the manipulation region 33F is illustrated for description, but such a dotted line is not displayed on the display unit 2 and the user views only a scene of the real space and the image 37 through the transparent display unit 2.

Thus, even when the hands-free HMD 1 is mounted on the user, the user can input (manipulate) data while actually touching a calculator, a keyboard, a mouse, a portable telephone terminal, or the like present in the real space to obtain a manipulation feeling. An object (manipulation input device) used for the manipulation may not necessarily be connected to the HMD 1 electrically or physically, communication connection or wiring between the device and the HMD 1 is not necessary. Since it is not necessary to feed power to the manipulation input device (for example, the calculator (object 50F) illustrated in FIG. 9), and it does not matter whether a battery is exhausted, or a display function or an input function malfunctions, ultimate recycling can be realized.

Then, in step S118, the operation control unit 10b determines whether the association of the function is released. When the association of the function is released (S118/YES), the present operation process ends.

[3-5. Fifth Embodiment]

In the above-described fourth embodiment, the manipulation region 33 is automatically selected (see S120), but the scope of the present disclosure also includes a case in which the manipulation region 33 is selected by the user. Hereinafter, a fifth embodiment in which the manipulation region 33 is selected by the user will be described specifically with reference to FIGS. 10 and 11.

Figure 10:
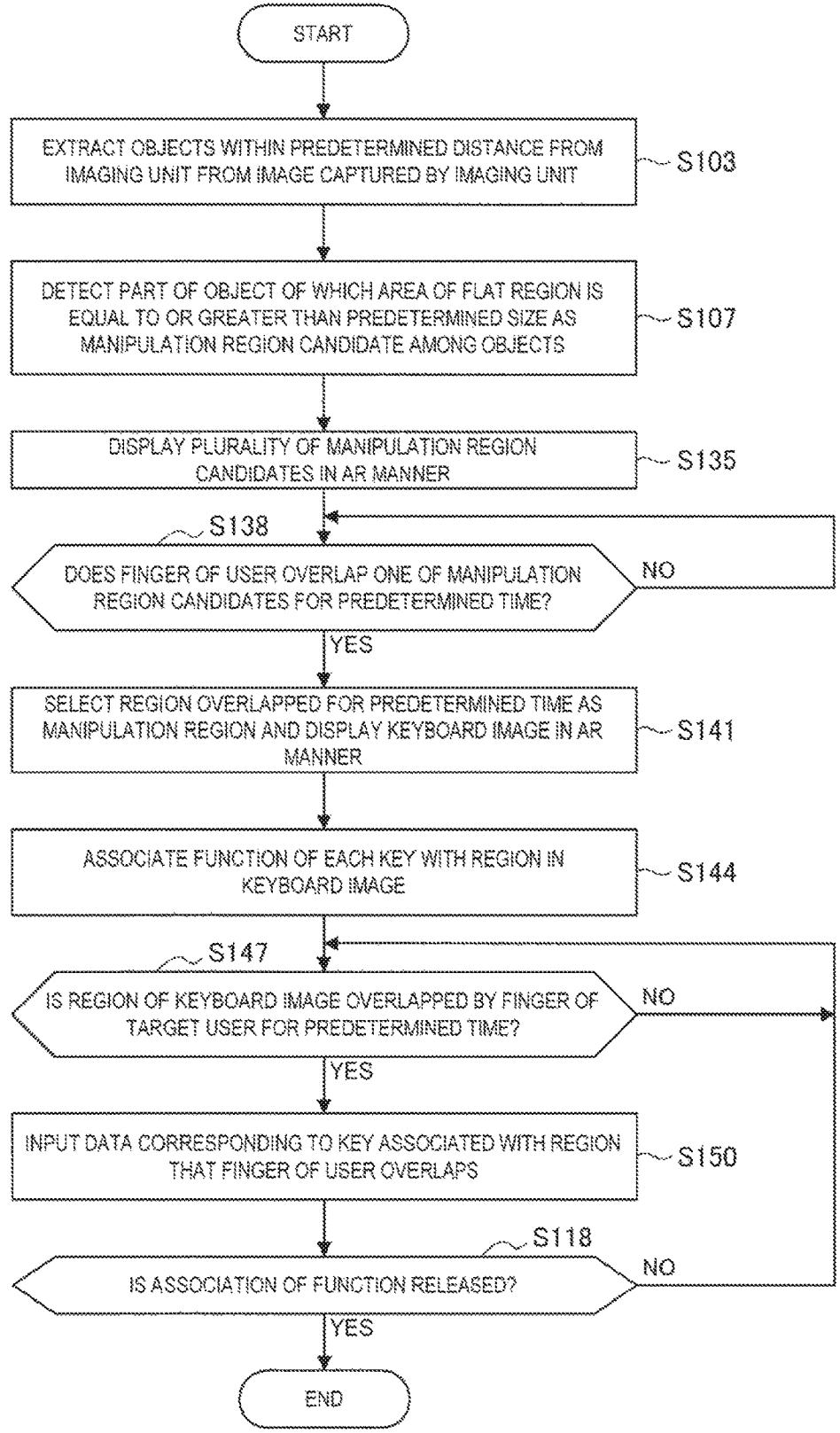
FIG. 10 is a flowchart illustrating a process of a control operation according to a fifth embodiment.

FIG. 10 is a flowchart illustrating a process of a control operation according to the fifth embodiment. In steps S103 and S107 illustrated in FIG. 10, the external situation determination unit 10a (detection unit) performs the same processes as in the steps described with reference to FIG. 8.

Next, in step S135, the operation control unit 10b controls the display control unit 14 such that manipulation region candidates detected in S107 are displayed in the AR manner on the display unit 2. Specifically, for example, as illustrated in the upper portion of FIG. 11, the operation control unit 10b displays AR images on the display unit 2 so that the AR images are seen to overlap with manipulation region candidates 35A, 35E, and 35F of an object 50A (notebook-type PC), an object 50E (desk), and an object 50F (calculator) viewed from the transparent display unit 2. Here, the AR image displayed on the display unit 2 may be color images or blinking images superimposed on the manipulation region candidates 35 or may be frame images overlapping to surround the manipulation region candidates 35. Thus, the HMD 1 can suggest the detected manipulation region candidates to the user.

Subsequently, in step S138, the operation control unit 10b recognizes a finger 40 of the user from the image feature amount or the like based on a captured image including the range of the field of vision of the user and determines whether the manipulation region candidate 35 is overlapped by the finger 40 for a predetermined time (for example, about 0.5 seconds).

Next, when the operation control unit 10b determines that the manipulation region candidate 35 is overlapped by the finger 40 for the predetermined time (S138/YES), the operation control unit 10b selects the manipulation region candidate 35 corresponding to the position of the finger 40 as the manipulation region 33 in step S141. For example, in an example illustrated in the middle of FIG. 11, when the finger 40 of the user overlaps the manipulation region candidate 35E for the predetermined time, the operation control unit 10b can select the manipulation region candidate 35E as the manipulation region 33E. Thus, in the embodiment, the user can select the manipulation region by arbitrarily pointing to or tapping the manipulation region with his or her finger among the plurality of manipulation region candidates 35.

The operation control unit 10b may control the display control unit 14 such that the manipulation unit image (manipulation screen) is displayed on the display unit 2 to be superimposed as AR information in the manipulation region selected according to the instruction from the user. Specifically, for example, as illustrated in the lower portion of FIG. 11, the operation control unit 10b displays a keyboard image 38 in a part of the display unit 2 so that the keyboard image 38 is viewed to overlap with the manipulation region 33E when the user views the scene of the real space from the transparent display unit 2. In the example illustrated in the lower portion of FIG. 11, a dotted line indicating the manipulation region 33E is illustrated for description, but such a dotted line is not displayed on the display unit 2 and the user views only the scene of the real space and the keyboard image 38 through the transparent display unit 2.

Subsequently, in step S144, the operation control unit 10b associates a predetermined manipulation function with each region in the manipulation unit image displayed to be superimposed as the AR information. In the embodiment, the operation control unit 10b associates each region in the keyboard image 38 with a function of a key of a keyboard.

Subsequently, in step S147, the operation control unit 10b recognizes a finger 40 of the user from the image feature amount or the like based on a captured image including the range of the field of vision of the user and determines whether the region in the keyboard image 38 is overlapped by the finger 40 for a predetermined time (for example, about 0.5 seconds).

Figure 11:
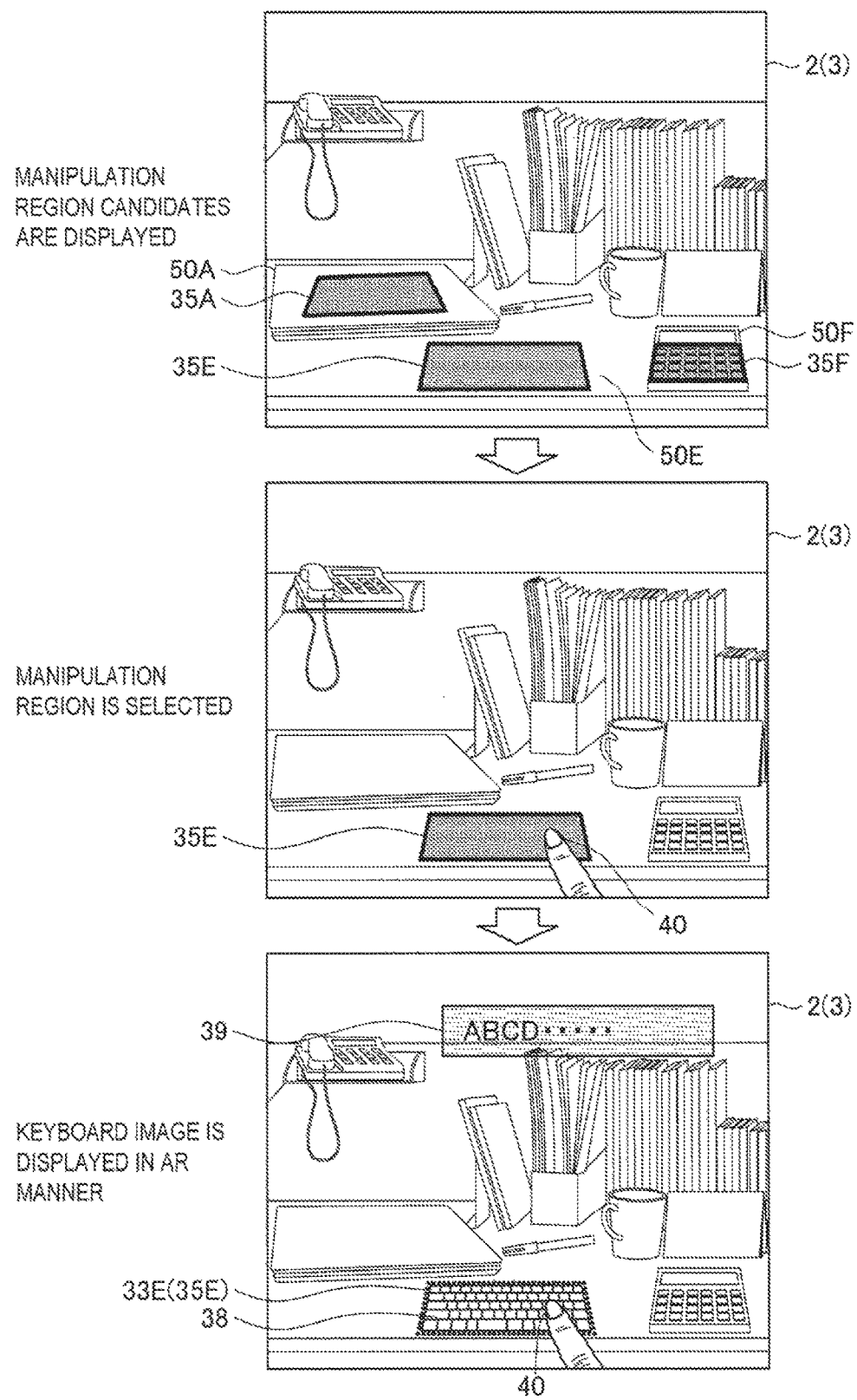
FIG. 11 is a diagram for describing the control operation according to the fifth embodiment.

Next, when the operation control unit 10b determines that the finger 40 overlaps the keyboard image 38 for the predetermined time (S147/YES), the operation control unit 10b performs the key function associated with the region of the keyboard image 38 that the finger 40 overlaps in step S150. That is, data corresponding to the key associated with the region (key image) of the keyboard image 38 that the finger 40 overlaps is received as an input value. At this time, the operation control unit 10b may control the display control unit 14 such that the data received as the input value is displayed on the display unit 2. For example, as illustrated in FIG. 11, the operation control unit 10b displays an image 39 indicating the data received as the input value in a part of the display unit 2.

Thus, the user can select the manipulation region from the plurality of manipulation region candidates and input (manipulate) the data while actually touching the selected manipulation region. In the embodiment, the display indicating the manipulation region candidates and the manipulation unit image is displayed on the display unit 2 in the AR manner, but the embodiment is not limited to the AR display on the display unit 2. As in the third embodiment, the display indicating the manipulation region candidates or the manipulation unit image may be projected to the real space by the projector unit 7.

Then, in step S118, the operation control unit 10b determines whether the association of the function is released. When the association of the function is released (S118/YES), the present operation process ends.

[3-6. Sixth Embodiment]

In the above-described fourth embodiment, the function according to each button is associated based on the image analysis result of the selected manipulation region. Specifically, in the region of the number key, the function of the number key is associated and number data is received as the input value. However, the association of the function according to the present disclosure is not limited to the fourth embodiment and the scope of the present disclosure also includes a case in which a similar function of the HMD 1 is associated according to a kind of object (manipulation input device) in which a manipulation region is selected. Hereinafter, the sixth embodiment in which the similar function of the HMD 1 is associated according to a kind of object will be described specifically with reference to FIGS. 12 and 13.

Figure 12:
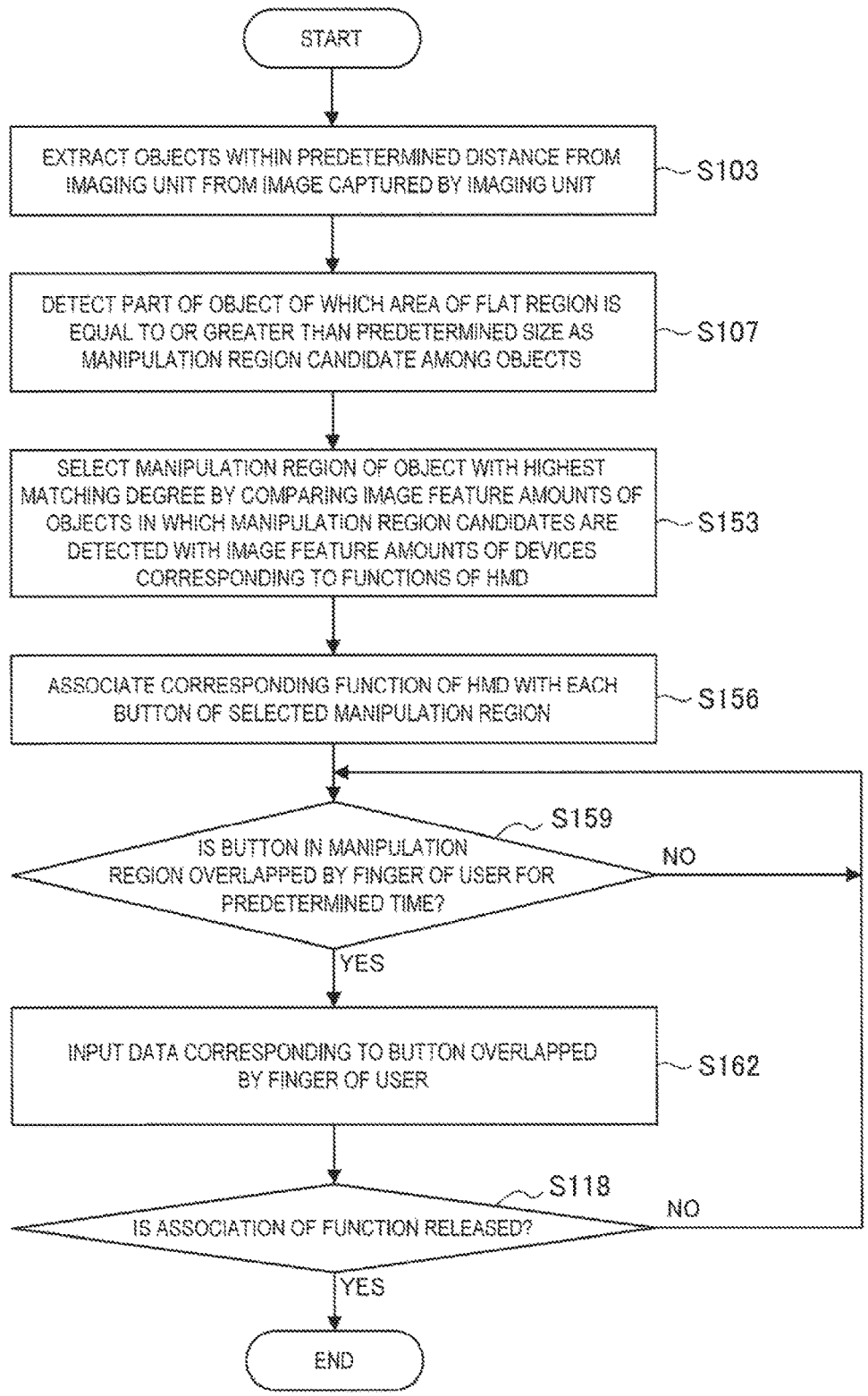
FIG. 12 is a flowchart illustrating a process of a control operation according to a sixth embodiment.
Figure 13:
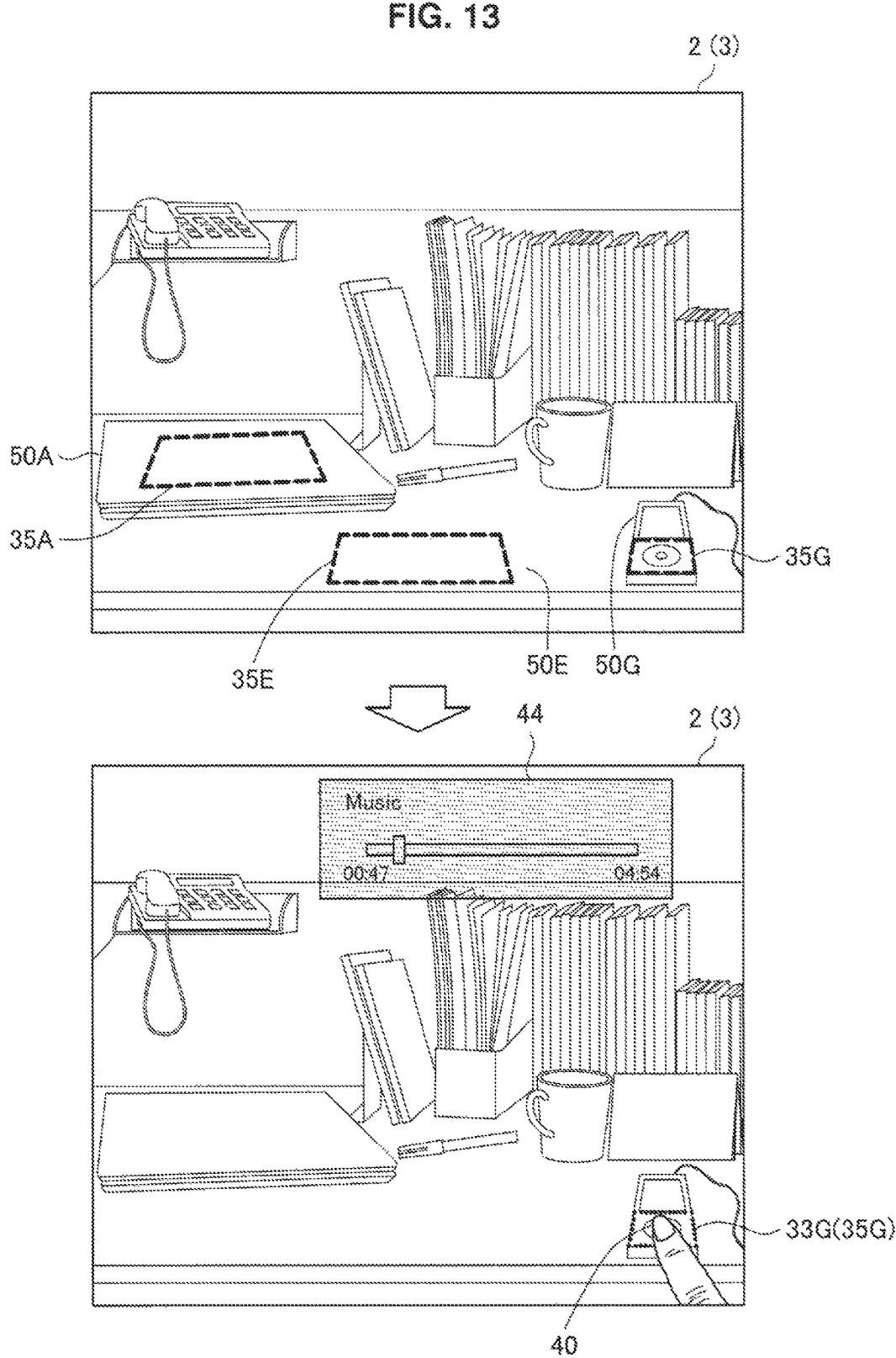
FIG. 13 is a diagram for describing the control operation according to the sixth embodiment.

FIG. 12 is a flowchart illustrating a process of a control operation according to the sixth embodiment. In steps S103 and S107 illustrated in FIG. 12, the external situation determination unit 10a (detection unit) performs the same processes as in the steps described with reference to FIG. 8. Specifically, the external situation determination unit 10a (detection unit) extracts objects 50A, 50E, and 50G based on a captured image captured by imaging a range including the field of vision of the user viewed through the transparent display unit 2 by the imaging unit 3, as illustrated in FIG. 13 (S103). Further, the external situation determination unit 10a (detection unit) detects manipulation region candidates 35A, 35E, and 35G from the object 50A (a notebook-type PC), the object 50E (a desk), and the object 50G (a music player) (S107).

In an example illustrated in the upper portion of FIG. 13, dashed lines indicating the manipulation region candidates 35A, 35E, and 35G are illustrated for description, but such dashed lines are not displayed on the display unit 2 and the user views only a scene of the real space through the transparent display unit 2.

Next, in step S153, the operation control unit 10b selects the manipulation region of the object with the highest matching degree by comparing the image feature amounts of the manipulation region candidates with the image feature amounts of the devices corresponding to the functions of the HMD 1 and stored in advance in the storage unit 25. For example, a case in which image feature amounts of a music player, a TV remote controller, a portable telephone terminal, a phone, and the like are stored as the image feature amounts of the devices corresponding to the functions of the HMD 1 in the storage unit 25 is assumed. In this case, the operation control unit 10b selects the manipulation region candidate 35G of the object 50G with the highest matching degree of the music player as a manipulation region 33G among the objects 50A, 50E, and 50G illustrated in FIG. 13.

Subsequently, in step S156, the operation control unit 10b associates the function of the HMD 1 similar to the function of the object in which the manipulation region is detected with each button (physical manipulator) in the selected manipulation region. For example, in the example illustrated in the lower portion of FIG. 13, since the object 50G in which the manipulation region 33G is detected is the music player, the operation control unit 10b associates a music reproduction function of the HMD 1 with each button in the manipulation region 33G.

Subsequently, in step S159, the operation control unit 10b recognizes a finger 40 of the user from the image feature amount or the like based on a captured image including the range of the field of vision of the user and determines whether the button in the manipulation region 33G is overlapped by the finger 40 for a predetermined time (for example, about 0.5 seconds).

Next, when the operation control unit 10b determines that the button in the manipulation region 33G is overlapped by the finger 40 for the predetermined time (S159/YES), the operation control unit 10b performs the key function associated with the button in the manipulation region 33G and corresponding to the position of the finger 40 in step S162. That is, a reproduction instruction corresponding to a reproduction button present in the manipulation region 33G and associated with the button that the finger 40 overlaps is received as a manipulation input, and the operation control unit 10b controls the sound input and output control 28 such that music reproduction is performed from the sound output unit 5.

At this time, the operation control unit 10b may control the display control unit 14 such that feedback of the received manipulation input is displayed on the display unit 2. For example, as illustrated in the lower portion of FIG. 13, the operation control unit 10b may display an image 44 indicating the title or a reproduction time of music which is being reproduced according to a manipulation of the reproduction button in a part of the transparent display unit 2. In the example illustrated in the lower portion of FIG. 13, a dotted line indicating the manipulation region 33G is illustrated for description, but such a dotted line is not displayed on the display unit 2 and the user views only a scene of the real space and the image 44 through the transparent display unit 2.

Then, in step S118, the operation control unit 10b determines whether the association of the function is released.

When the association of the function is released (S118/ YES), the present operation process ends.

The sixth embodiment has been described above. Accordingly, for example, when a button in a manipulation region is a number key and the number key is installed on a remote controller of a television (TV), a channel manipulation function of a TV program reproduced with the display unit 2 of the HMD 1 is associated. On the other hand, when the number key is installed in a portable telephone terminal, a telephone number input function of the HMD 1 is associated.

<3. Conclusion>

As described above, in the control system according to the embodiment, a manipulation function can be virtually associated with a predetermined region of a substantial object. For example, in the HMD 1 having the hands-free characteristics, a substantial object present in the real space can be used as a manipulation input device. Thus, the user can perform a manipulation on the HMD 1 by touching the substantial object present in the real space. In this case, the user can perform a manipulation input with a feeling similar to that of mouse manipulation, keyboard input, or the like, with which users are generally familiar.

It is not necessary to connect the object used as the manipulation input device to the HMD 1 electrically or physically, and thus communication connection or wiring between the object and the HMD 1 is not necessary. Further, it is not necessary to transmit input data from the substantial object to the HMD 1 either. Therefore, even when the substantial object is, for example, a wireless keyboard or mouse, it is not necessary to feed power. Even when the substantial object is a broken keyboard or mouse, the broken keyboard or mouse can be used as a manipulation input device as long as a manipulation region can be detected by the HMD 1 and can be associated with a manipulation function. Therefore, ultimate recycling can be realized.

The preferred embodiments of the present disclosure have been described above with reference to the appended drawings, but the present technology is not limited to the above examples. It is apparent to those skilled in the art that various modifications and corrections can be made within the scope of the technical spirit and essence described in the scope of the claims, and the modifications and the corrections are, of course, construed to pertain to the technical scope of the present disclosure.

For example, in each of the above-described embodiments, the AR information has been described as being displayed in a part of the display unit 2 so that the AR information overlaps with a scene of the real space from the transparent display unit 2 with reference to FIGS. 4 and 6, and the like. The image has been described as being viewed by displaying the captured image captured with the visual line direction of the user set as a subject direction and displaying the AR information to be superimposed as in the case illustrated in FIGS. 4 and 6, and the like. However, the embodiments are not limited thereto. Even when content (a photo, a video, or the like) is reproduced on the display unit 2 and most of the display unit 2 enters an opaque state, a manipulation region may be detected from a substantial object and a manipulation function may be associated. In this case, the user can perform a blind manipulation by touching the substantial object.

A substantial object in which a manipulation region is detected may be a paper medium on which a picture of a manipulator such as a keyboard or a numeric key is shown, in addition to an object with a flat region such as a top plate of a desk or a node PC and an object such as a keyboard or a calculator in which a physical manipulator is installed. The substantial object in which the manipulation region is detected may be a part of a body such as a palm.

In the fifth embodiment, the user voluntarily selects a manipulation region from the plurality of manipulation region candidates, but the scope of the present disclosure is not limited thereto. For example, the external situation determination unit 10a (detection unit) according to the embodiment may extract an object indicated by the user (pointed to or tapped with a finger, touched by a hand, or the like) as an object present (within a predetermined distance) at a position at which the user is estimated to be able to perform a manipulation and may detect a part of the object as a manipulation region.

Figure 14:
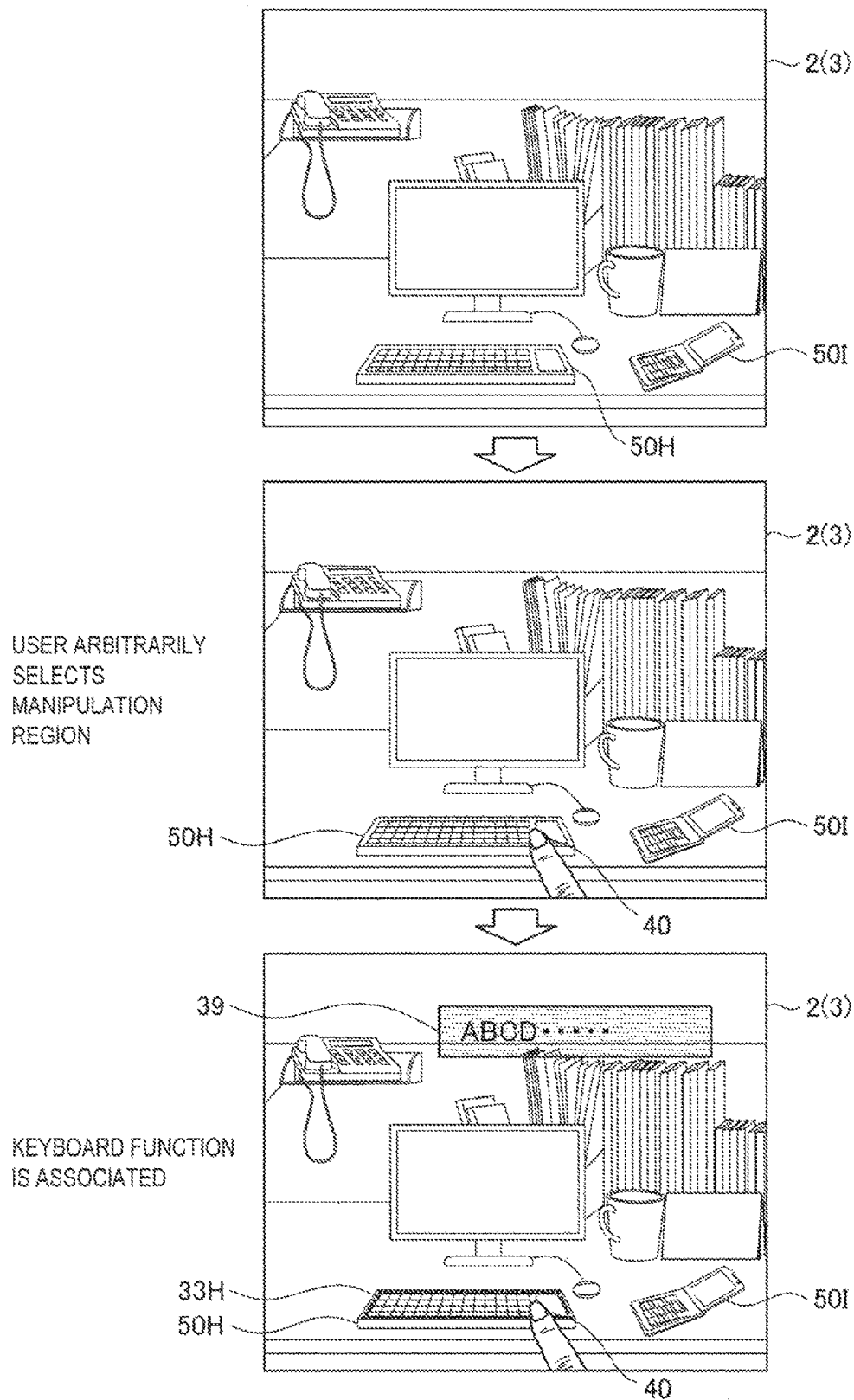
FIG. 14 is a diagram for describing a case in which a keyboard is selected as a manipulation input device.

More specifically, as illustrated in the upper portion of FIG. 14, when a keyboard (substantial object 50H) and a portable telephone terminal (substantial object 50I) are present in the real space, the user may select the keyboard with a finger 40 by touching (pointing to), for example, the keyboard with his or her finger 40, as illustrated in the middle of FIG. 14. At this time, the external situation determination unit 10a (detection unit) detects the keyboard (substantial object 50H) touched with the finger 40 based on a captured image captured by the imaging unit 3 as a manipulation region 33H, as illustrated in the lower portion of FIG. 14. In the example illustrated in the lower portion of FIG. 14, a dotted line indicating the manipulation region 33H is illustrated for description, but such a dotted line is not displayed on the display unit 2 and the user views only a scene of the real space through the transparent display unit 2.

Then, the operation control unit 10b associates each key function of the keyboard with a key of the detected manipulation region 33H. Thus, when a key of the manipulation region 33H is overlapped by the finger 40 for a predetermined time, the operation control unit 10b performs the key function associated with the key of the manipulation region 33H that the finger 40 overlaps. That is, data corresponding to the key associated with the key of the manipulation region 33H that the finger 40 overlaps is received as an input value. At this time, the operation control unit 10b may control the display control unit 14 such that the data received as the input value is displayed on the display unit 2. For example, as illustrated in the lower portion of FIG. 14, the operation control unit 10b displays an image 39 indicating the data received as the input value in a part of the display unit 2.

Figure 15:
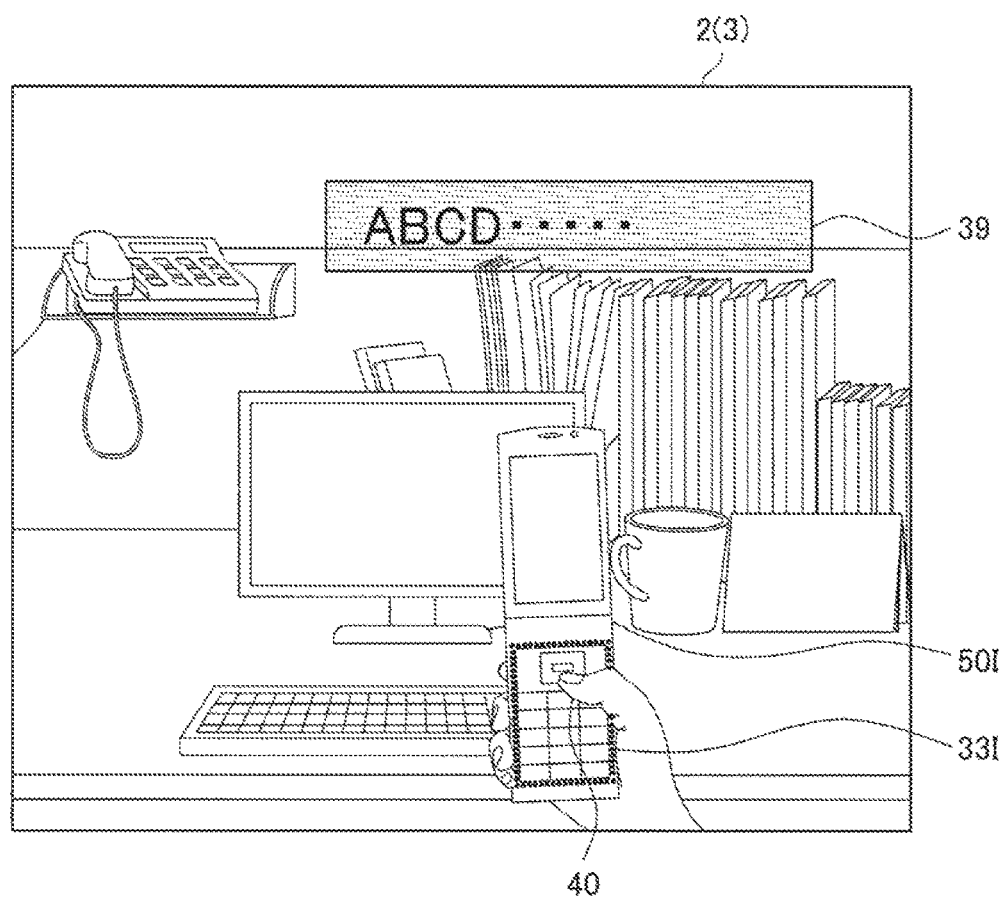
FIG. 15 is a diagram for describing a case in which a portable telephone terminal is selected as a manipulation input device.

Here, the case in which the keyboard (substantial object 50H) is selected has been described in the example illustrated in FIG. 14. However, as illustrated in FIG. 15, the user may, of course, select the portable telephone terminal (substantial object 50I). Even in this case, the external situation determination unit 10a (detection unit) detects the portable telephone terminal (substantial object 50I) touched with the finger 40 as a manipulation region 33I based on the captured image captured by the imaging unit 3.

Then, the operation control unit 10b associates input function of the portable telephone terminal with each key of the detected manipulation region 33I. Thus, when a key of the manipulation region 33I is overlapped by the finger 40 for a predetermined time, the operation control unit 10b performs the input function associated with the key of the manipulation region 33I that the finger 40 overlaps. That is, data corresponding to the input function associated with the key of the manipulation region 33I that the finger 40 overlaps is received as an input value. At this time, the operation control unit 10b may control the display control unit 14 such that the data received as the input value is displayed on the display unit 2. For example, as illustrated in FIG. 15, the operation control unit 10*b* displays an image 39 indicating the data received as the input value in a part of the display unit 2. In the example illustrated in FIG. 15, a dotted line indicating the manipulation region 33I is illustrated for description, but such a dotted line is not displayed on the display unit 2 and the user views only the image 39 displayed on the transparent display unit 2 and a scene of the real space through the transparent display unit 2.

As described above with reference to FIGS. 14 and 15, a keyboard or a portable telephone terminal for general use can also be used as a manipulation input device of the HMD 1. In particular, a user may wish to continuously use a keyboard or a portable telephone terminal even when the keyboard or the portable telephone terminal breaks electrically because there is key assignment which is familiar to the user and is easy to use. Even in this case, according to the disclosure, the keyboard or the portable telephone terminal which is familiar but is broken can also be used as a manipulation input device of the HMD 1, and thus can satisfy the user.

For example, when a user replaces a portable telephone terminal, key arrangement, key assignment, or the like of the portable telephone terminal before the replacement familiar to a carrier or a terminal maker is slightly different, and thus it is difficult to use the replaced portable telephone terminal and there is a problem at the time of the replacement. However, when the familiar portable telephone terminal before the replacement can be reused as a manipulation input device of the HMD 1, convenience is improved and the portable telephone terminal is useful particularly for a user who writes a report with a portable telephone terminal.

Additionally, the present technology may also be configured as below.

(1)

A control device including:

a detection unit configured to detect, as a manipulation region, at least a part of a substantial object present at a position at which a user is estimated to be able to perform a manipulation;

a function setting unit configured to perform setting in a manner that a predetermined function matches the manipulation region detected by the detection unit; and a control unit configured to perform the function matched with the manipulation region based on a positional relation between the manipulation region and a manipulator.

(2)

The control device according to (1), wherein the detection unit detects, as a manipulation region, at least a part of a substantial object present at a position at which the user is estimated to be able to perform a manipulation directly or indirectly.

(3)

The control device according to (1) or (2), wherein the manipulator is a finger of the user or an object held by the user.

(4)

The control device according to any one of (1) to (3), wherein, in the substantial object present at the position at which the user is estimated to be able to perform the manipulation, the detection unit preferentially detects, as the manipulation region, at least a part of the substantial object in which a manipulation unit is provided.

(5)

The control device according to any one of (1) to (4), wherein the control unit controls a display unit in a manner that a virtual manipulation screen is displayed to be superimposed on the manipulation region detected by the detection unit.

(6)

The control device according to (5), wherein the control device is a head-mounted display device, and wherein the control unit performs control in a manner that the manipulation screen is displayed to be superimposed on the manipulation region of the substantial object appearing on a display screen of the head-mounted display device.

(7)

The control device according to any one of (1) to (6), further including:

an image projection unit, wherein the control unit controls the image projection unit in a manner that a manipulation screen is projected to the manipulation region detected by the detection unit.

(8)

The control device according to any one of (1) to (7), wherein the function setting unit performs the setting in a manner that a predetermined function matches one manipulation region selected by the user when a plurality of manipulation regions are detected through the detection.

(9)

The control device according to any one of (1) to (8), wherein the function setting unit performs the setting in a manner that a function similar to a function of the substantial object of which the manipulation region is detected is matched as a function of the manipulation region.

(10)

The control device according to any one of (1) to (9), wherein the detection unit detects, as a manipulation region, at least a part of a substantial object instructed by the user.

(11)

A storage medium having a program stored therein, the program causing a computer to function as:

a detection unit configured to detect, as a manipulation region, at least a part of a substantial object present at a position at which a user is estimated to be able to perform a manipulation;

a function setting unit configured to perform setting in a manner that a predetermined function matches the manipulation region detected by the detection unit; and a control unit configured to perform the function matched with the manipulation region based on a positional relation between the manipulation region and a manipulator.

REFERENCE SIGNS LIST

1 head-mounted display (HMD)
2 display unit
3 imaging unit
4 illumination unit
5 sound output unit
6 sound input unit
7 projector unit
10 system controller
10*a* external situation determination unit
10*b* operation control unit
11 imaging control unit
12 display image processing unit
13 display driving unit
14 display control unit
15 imaging signal processing unit
16 sound signal processing unit
17 image analysis unit 18 illumination control unit
19 ambient environment sensor
20 imaging target sensor
21 GPS reception unit
22 date counting unit
25 storage unit
26 communication unit
27 image input and output control
28 sound input and output control
29 sound combining unit
31 mouse pointer
33, 33A to 33I manipulation region
35, 35A to 35G manipulation region candidate
38 keyboard image
50A to 50I object (substantial object)
40 finger

What is claimed is:

1. A display control apparatus, comprising:
circuitry configured to:
acquire image data from a camera configured to capture an ambient environment of a user of a head-mounted display;
detect, based on simultaneous localization and mapping using the acquired image data, at least two substantially flat regions each of which represents a part of the ambient environment;
control, based on the detected substantially flat regions, the head-mounted display to display at least two virtual objects at respective positions corresponding to the substantially flat regions, when viewed by the user;
detect, based on the acquired image data, a select operation of the user to select a displayed virtual object of the displayed at least two virtual objects;
control, based on the detected select operation, the head-mounted display to display an on-screen user interface at a respective position of the selected displayed virtual object;
detect, based on the acquired image data, a hand-input operation to the displayed on-screen user interface; and
control the head-mounted display to change, based on the detected hand-input operation, an input region to represent an input result corresponding to the displayed on-screen user interface, wherein the input region is displayed above the respective position of the selected displayed virtual object.

2. The display control apparatus according to claim 1, wherein the circuitry is further configured to detect, based on the acquired image data, regions having distances from the head-mounted display equal to or less than a particular distance, as the at least two substantially flat regions.

3. The display control apparatus according to claim 1, wherein the circuitry is configured to determine whether the hand-input operation to the displayed on-screen user interface is detected based on a time period that a part of a hand of the user is overlapped with one of the at least two substantially flat regions.

4. The display control apparatus according to claim 1, wherein the circuitry is configured to detect the hand-input operation from an image feature amount of a part of a hand of the user based on the acquired image data.

5. The display control apparatus according to claim 1, wherein the on-screen user interface is a software keyboard displayed on a flat surface of a real object included in the ambient environment.

6. A display control method, comprising:
acquiring image data from a camera configured to capture an ambient environment of a user of a head-mounted display;
detecting, based on simultaneous localization and mapping using the acquired image data, at least two substantially flat regions each of which represents a part of the ambient environment;
controlling, based on the detected substantially flat regions, the head-mounted display to display at least two virtual objects at respective positions corresponding to the substantially flat regions, when viewed by the user;
detecting, based on the acquired image data, a select operation of the user to select a displayed virtual object of the displayed at least two virtual objects;
controlling, based on the detected select operation, the head-mounted display to display an on-screen user interface at a respective position of the selected displayed virtual object;
detecting, based on the acquired image data, a hand-input operation to the displayed on-screen user interface; and
controlling the head-mounted display to change, based on the detected hand-input operation, an input region to represent an input result corresponding to the displayed on-screen user interface, wherein the input region is displayed above the respective position of the selected displayed virtual object.

7. A non-transitory computer-readable medium having stored thereon, computer-executable instructions, which when executed by a computer of a head-mounted display, cause the computer to execute operations, the operations comprising:
acquiring image data from a camera configured to capture an ambient environment of a user of the head-mounted display;
detecting, based on simultaneous localization and mapping using the acquired image data, at least two substantially flat regions each of which represents a part of the ambient environment;
controlling, based on the detected substantially flat regions, the head-mounted display to display at least two virtual objects at respective positions corresponding to the substantially flat regions, when viewed by the user;
detecting, based on the acquired image data, a select operation of the user to select a displayed virtual object of the displayed at least two virtual objects;
controlling, based on the detected select operation, the head-mounted display to display an on-screen user interface at a respective position of the selected displayed virtual object;
detecting, based on the acquired image data, a hand-input operation to the displayed on-screen user interface; and
controlling the head-mounted display to change, based on the detected hand-input operation, an input region to represent an input result corresponding to the displayed on-screen user interface, wherein the input region is displayed above the respective position of the selected displayed virtual object.

* * * * *